United States Patent
Kim et al.

(10) Patent No.: US 12,514,919 B2
(45) Date of Patent: Jan. 6, 2026

(54) INFLUENZA VACCINE COMPOSITION BASED ON NOVEL NUCLEIC ACID

(71) Applicant: NA VACCINE INSTITUTE, Seoul (KR)

(72) Inventors: Mee Hyein Kim, Daejeon (KR); Jin Soo Shin, Daejeon (KR); Dong Ho Kim, Seongnam-si (KR); Eui Ho Kim, Seoul (KR); Myung Soo Kang, Seoul (KR); Ye Jin Jang, Daejeon (KR)

(73) Assignee: NA VACCINE INSTITUTE, Seoul (KR)

( * ) Notice: Subject to any disclaimer, the term of this patent is extended or adjusted under 35 U.S.C. 154(b) by 930 days.

(21) Appl. No.: 17/675,535

(22) Filed: Feb. 18, 2022

(65) Prior Publication Data

US 2022/0175909 A1     Jun. 9, 2022

Related U.S. Application Data

(63) Continuation-in-part of application No. PCT/KR2020/011510, filed on Aug. 27, 2020.

(30) Foreign Application Priority Data

Aug. 28, 2019   (KR) .................. 10-2019-0106158

(51) Int. Cl.
A61K 39/145    (2006.01)
A61P 31/16     (2006.01)
A61K 39/00     (2006.01)

(52) U.S. Cl.
CPC ............ *A61K 39/145* (2013.01); *A61P 31/16* (2018.01); *A61K 2039/53* (2013.01); *A61K 2039/543* (2013.01)

(58) Field of Classification Search
CPC .... A61K 2039/53; A61K 39/145; A61P 31/16
See application file for complete search history.

(56) References Cited

U.S. PATENT DOCUMENTS

| | | |
|---|---|---|
| 7,344,722 B1 | 3/2008 | Maassab et al. |
| 9,603,919 B2 | 3/2017 | Hasegawa et al. |
| 10,195,266 B2 | 2/2019 | Jeong et al. |
| 2007/0224219 A1 | 9/2007 | Carter et al. |
| 2011/0223198 A1 | 9/2011 | Carter et al. |
| 2013/0178611 A1 | 7/2013 | Seya et al. |
| 2015/0064216 A1 | 3/2015 | Carter et al. |
| 2015/0307884 A1 | 10/2015 | Nakano et al. |
| 2018/0044678 A1 | 2/2018 | Nakano et al. |
| 2021/0246452 A1 | 8/2021 | Yan et al. |
| 2022/0056450 A1 | 2/2022 | Yan et al. |

FOREIGN PATENT DOCUMENTS

| | | |
|---|---|---|
| KR | 1020150136200 | 3/2016 |
| KR | 10-1637955 | 7/2016 |
| WO | WO 2007/067517 | 6/2007 |
| WO | WO 2014/088087 A1 | 6/2014 |
| WO | WO 2019/147308 A2 | 8/2019 |
| WO | WO 2019/147308 A3 | 8/2019 |
| WO | WO 2019/147308 A9 | 8/2019 |

OTHER PUBLICATIONS

Extended European Search Report issued Oct. 2, 2023, in corresponding European Patent Application No. 20857861.7, 12 pages.
Takeshi Ichinohe et al., "Synthetic double-stranded RNA poly(I:C) combined with mucosal vaccine protects against influenza virus infection", Mar. 1, 2005, Journal of Virology, the American Society for Microbiology, US, pp. 2910-2919, XP002424577.
Beth C. Holbrook et al., "A Novel R848-Conjugated Inactivated Influenza Virus Vaccine Is Efficacious and Safe in a Neonate Nonhuman Primate Model ", The Journal of Immunology, vol. 197, No. 2, Jul. 15, 2016, pp. 1-24.
Doreen Krumbiegel et al., "Combined Toll-like receptor agonists synergistically increase production of inflammatory cytokines in human neonatal dendritic", Human Immunology, New York, US, vol. 68, No. 10, Oct. 1, 2007, pp. 813-822.
Gregory Gautier et al., "A type I interferon autocrine-paracrine loop is involved in Toll-like receptor-induced interleukin-12p70 secretion by dendritic calls", Journal of Experimental Medicine, vol. 201, No. 9, May 2, 2005, pp. 1435-1446.
Mahyar Nouri-Shiraza et al., "TLR8 combined withTLR3 or TLR4 agonists enhances DC-NK driven effector Tc1 cells", Immunology Letters, Elsevier BV, NL, vol. 193, Dec. 1,2017, pp. 58-66.
Frances E Pearson et al., "Activation of human CD141$^+$ and CD1c$^+$ dendritic cells in vivo with combined TLR3 and TLR7/8 ligation", Immunology and Cell Biology, Carlton, AU, vol. 96, No. 4, Feb. 10, 2018, pp. 390-400.
Lu Zhang et al., "Effect of vaccine administration modality on immunogenicity and efficacy", Expert Review of Vaccines, vol. 14, No. 11, Nov. 2, 2015, pp. 1509-1523.
International Search Report—issued Dec. 9, 2020, in PCT/KR2020/011510, English translation—4 pages.
Hobson et al, "The role of serum haemagglutination-inhibiting antibody in protection against challenge infection with influenza A2", *J. Hyg., Gamb.* (1972), 70, pp. 767-777 (printed in Great Britain).
John Treanor et al, "Evaluation of a single dose of half strength inactivated influenza vaccine in healthy adults", *Vaccine* 20 (2002) pp. 1099-1105.
Clements et al, "Serum and Nasal Wash Antibodies Associated with Resistance to Experimental Challenge with Influenza A Wild-Type Virus", *Journal of Clinical Microbiology*, Jul. 1986, vol. 24, No. 1, pp. 157-160.
Kuno-Sakai et al, "Developments in mucosal influenza virus vaccines", Vaccine, 1994, vol. 12, No. 14, pp. 1303-1310.

(Continued)

*Primary Examiner* — Bao Q Li
(74) *Attorney, Agent, or Firm* — Oblon, McClelland, Maier & Neustadt, L.L.P.

(57) ABSTRACT

Provided is an influenza vaccine composition based on a novel ribonucleic acid having a dual function of serving as an immunity-boosting agent and capturing antigens.

16 Claims, 20 Drawing Sheets

Figure 1A:
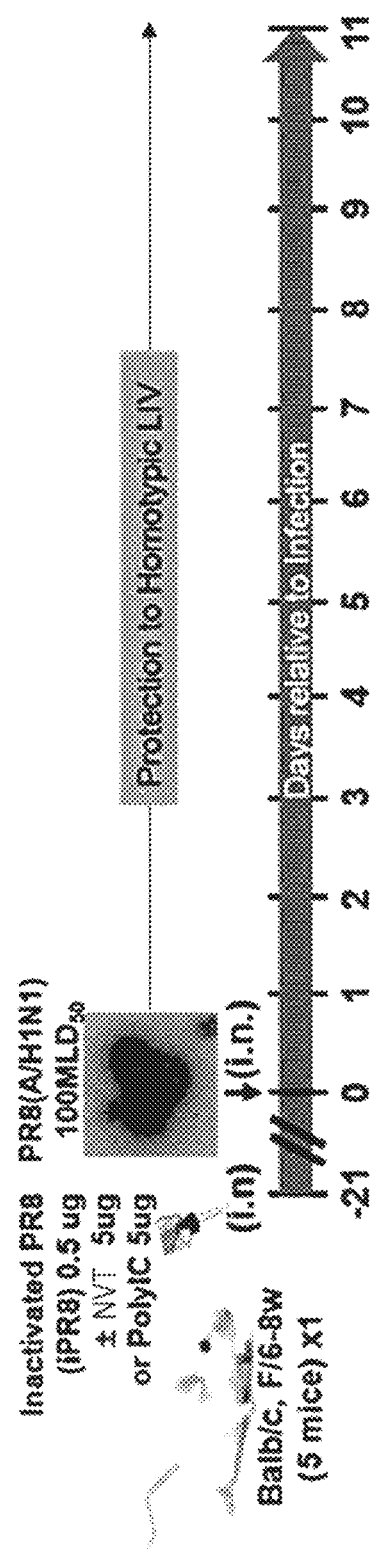
Figure 1B:
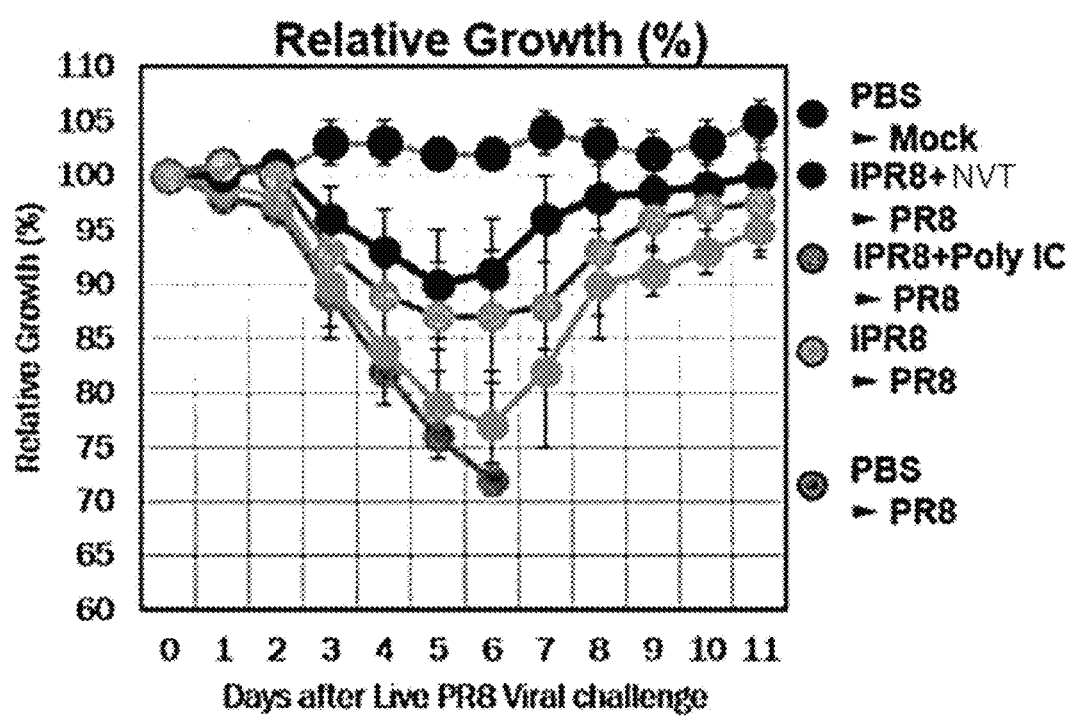
Figure 1C:
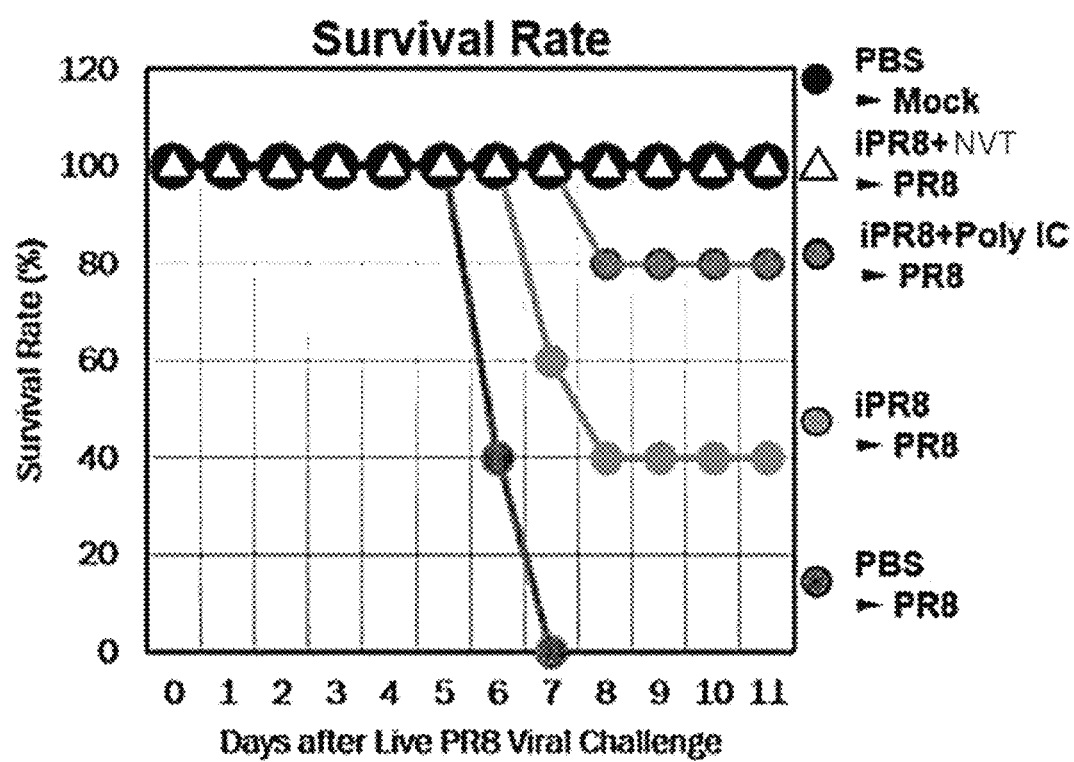

Specification includes a Sequence Listing.

(56) References Cited

OTHER PUBLICATIONS

Tamura et al, "Protection against influenza virus infection by vaccine inoculated intranasal with cholera toxin B subunit", Vaccine, 1988, vol. 6 pp. 409-413.
Ziegler et al, "A New RNA-Based Adjuvant Enhances Virus-Specific Vaccine Responses by Locally Triggering TLR- and RLH-Dependent Effects", J Immunol 2017; vol. 198: pp. 1595-1605.
NCBI. GenBank Accession No. KF960044.I. Sacbrood vims strain BJ 2012, complete genome. Mar. 4, 2014—4 pages.

FIG. 11A

SEQUENCE LISTING

```
<160> NUMBER OF SEQ ID NOS: 5

<210> SEQ ID NO 1
<211> LENGTH: 482
<212> TYPE: RNA
<213> ORGANISM: Artificial Sequence
<220> FEATURE:
<223> OTHER INFORMATION: Synthetic RNA, first strand of hsRNA

<400> SEQUENCE: 1
gggcgauaau acaguuuugg acucaggugu gagauuuuau gaucaggacu augaaggaca      60
```

| aauaacccca auggaauaug uacuggguu guauaacuuu uggucagggc caauagaguu | 120 |
| acguuugau uuuguuucaa augcguuuca cacuggaaca gugauuauau cagcggagua | 180 |
| uaaucgauca ucuacuaaua cggaugagug ucagucacac ucaacuuaua cuaaaacguu | 240 |
| ccacuuggga gaacaaaaau caguacauuu cacugugccu uauauauaug auacuguuau | 300 |
| gcggagaaau acggcuagcg ccuauuuacc gguaacugau uaugauaagg cagauaaugu | 360 |
| uaguagggcg caggcuacgg ggauuagagc agaaucuaaa augagaguga aagugagauc | 420 |
| gcccuauagu gagucguauu agcgacugc agaggccugc augcaagcuu ggcguaauca | 480 |
| ug | 482 |

<210> SEQ ID NO 2
<211> LENGTH: 475
<212> TYPE: RNA
<213> ORGANISM: Artificial Sequence
<220> FEATURE:
<223> OTHER INFORMATION: Synthetic RNA, second strand of a hsRNA

<400> SEQUENCE: 2

| gggcgaucuc acuucacuc ucauuuaga uucugcucua auccccguag ccugcgcccu | 60 |
| acuaacauua ucugccuuau cauaaucagu uaccgguaaa uaggcgcuag ccguauuucu | 120 |
| ccgcauaaca guaucauaua uauaaggcac agugaaaugu acugauuuuu guucucccaa | 180 |
| guggaacguu uuaguauaag uugaguguga cugacacuca uccguauuag uagaugaucg | 240 |
| auuauacucc gcuguauaaa ucacuguucc agugugaaac gcauuugaaa caaaaucaaa | 300 |
| acguaacucu auuggcccug accaaaaguu auacaacccca guuacauauu ccauggggu | 360 |
| uauuugccu ucauaguccu gaucauaaaa ucucacaccu gaguccaaaa cuguauuauc | 420 |
| gcccuauagu gagucguauu aggauccgau aucuagaugc auucgcgagg uaccg | 475 |

<210> SEQ ID NO 3
<211> LENGTH: 424
<212> TYPE: RNA
<213> ORGANISM: Artificial Sequence
<220> FEATURE:
<223> OTHER INFORMATION: Synthetic RNA, dsRNA region of a hsRNA

<400> SEQUENCE: 3

| gggcgauaau acaguuuugg acucaggugu gagauuuuau gaucaggacu augaaggaca | 60 |
| aauaacccca auggaauaug uaacuggguu guauaacuuu uggucagggc caauagaguu | 120 |
| acguuugau uuuguuucaa augcguuuca cacuggaaca gugauuauau cagcggagua | 180 |
| uaaucgauca ucuacuaaua cggaugagug ucagucacac ucaacuuaua cuaaaacguu | 240 |
| ccacuuggga gaacaaaaau caguacauuu cacugugccu uauauauaug auacuguuau | 300 |
| gcggagaaau acggcuagcg ccuauuuacc gguaacugau uaugauaagg cagauaaugu | 360 |
| uaguagggcg caggcuacgg ggauuagagc agaaucuaaa augagaguga aagugagauc | 420 |
| gccc | 424 |

<210> SEQ ID NO 4
<211> LENGTH: 8192
<212> TYPE: DNA
<213> ORGANISM: Chinese Sacbrood virus strain BJ 2012

<400> SEQUENCE: 4

| atggacatga tttctccttt gttttatgga tatgttagaa gtaccaaccg attccctagg | 60 |

```
agtggaggaa tcagaagaga tttgtctgct gaatatagtt cacgcgcccg aacctataag      120
accaagttgg aggcgcgtaa ttgcggagtg gagagattat ctacaatcct tacctcttgt      180
aagaagacat ttgatacagt ggactcttat accgatttgt ttaatggttg ggtttctggt      240
aagtatgttg acaagaatgt ccactacacc gaagtgtcca gtgatgagag tggacgaaga      300
atctggaatg ttagacgtgc agtgtcaatt aagaccgcag aaggaattat agtatggcga      360
aaagttatta cctcgtacag ttgcagggtg gcttcagaat tagctgctaa gagtatattg      420
gtgcaatttg taggtccagt aaggacccag agtgatgagg taccctcgaa agaatctatt      480 caggggggacg ctacacagca aagttccaag gaagaaaata caataattac acgagatcag      540
caacagacag tttcggaaaa gataccatca acagttgggg acttggccat agcatcttct      600
gaaccaacgc aacagtttag gagtttaact aatcgttggt tgcctattaa ttcaattaga      660
gtaacagtaa atagtaaacg gaacgatatt ttggcacaat attatatccc agaagatttt      720
ctgttacatt atgctaagtg tgcgcctaat accataccat ttgagactta tgtgtacgga      780
aaatacgagt tagaattgaa gttcgtagct aatggtaata agtttcagtg tgggaaagtg      840
attatttctg taaaatttga cagttatcaa gctgataata taaatacagg gtttcaagca      900
gccttatcgc gaccgcacgt tatgctagat ttgtcaacta ataacgaagg agttcttaaa      960
ataccattta ggtatcaccg tgcctttgtt aggaatcaaa cgcacaaaac agctacggtg     1020
ggtataagac cagggaagtt tgctagtatt tatgtgcaag tgttgtcacc gttacagacg     1080
ggagagggat gtgcgaacga tacgtttata cgaccttttt atcggtatac acgagctgaa     1140
tttgcgggaa cgtcggataa agtcccattg acccagacgg atgttatagg tactttatta     1200
tctggagggc caacaccagc tcttaaggat attttagtag gtgtagagag aacactggac     1260
cagttgggcc gaggtaataa tcaagataaa ccgaaggaca taagtagcat aactataatt     1320
ccgaaacctc gtttgggttc ccctcatggg aaaggtaaga gtgatgcagt agccatgcga     1380
gtaaatccgg tggcactaac atcatttcaa gatgtgaacg cttattccga tgagccccgt     1440
actacattgg atatagctcg tatatggggt ttgagaagta cgtttaattg gggatcagga     1500
gatgcacatg gcaaagagtt atttaataca gttttggact caggtgtgag atttatgat      1560 caggactatg aaggacaaat aaccccaatg gaatatgtaa ctgggttgta taacttttgg     1620
tcagggccaa tagagttacg ttttgatttt gtttcaaatg cgtttcacac tggaacagtg     1680
attatatcag cggagtataa tcgatcatct actaatacgg atgagtgtca gtcacactca     1740
acttatacta aaacgttcca cttgggagaa caaaaatcag tacatttcac tgtgccttat     1800
atatatgata ctgttatgcg gagaaatacg gctagcgcct atttaccggt aactgattat     1860
gataaggcag ataatgttag tagggcgcag gctacgggga ttagagcaga atctaaaatg     1920
agagtgaaag tgagagtggt taacgtttta aggcctgtag cctctactac ctcaactata     1980
gaagttttgg tgtatatgcg aggaggaaag aactatgcat tgcatggttt aaaacagtca     2040
acgtattggc cgtcaaggag tgtggtaccg atagatagtt ttccacctga tggttatgat     2100
ccagttaagc caacaaatag accaacaagg ggggtgggtt cgccagatag caatgggggt     2160
aagggacaat ctacggtagc cgtatcagat aatccacata gattcctgcc cgcgaatgta     2220
tctaatcgtt ggaatgagta ttcgagtgct tatttaccgc gggtacaaat ggatactggt     2280
gataaagaag atgaagatga aactgctaat ttcagtgatg gagttacagc gatgggtttc     2340
caatctttgg atacccaggt attgattaag gatattttgc gaagaccagt gttgttgttt     2400
aatcacgtac aattggatcc tggctataca ggttttttta tacctataat gccgccttct     2460
```

```
agaatgatgc aatataaatc aggagatagg gaaacatcct ttcagcgatt gattggtcgt    2520
acgccccaag cagcaattat gaatttattt aggttttgga gagggtcatt gcggtatact    2580
attattatac acagtaccga tggtcatcct atatatgtaa cgcacgtacc ccatacggga    2640
aatagagtgt atggtttaat gaaagtaaat aatttacacg agtatacgaa ggttcctatt    2700
tttgggagtg gtttaacaac tgaaatgatt atccctagcg tgaatccgag tatatgtgta    2760
gaagtaccat ttgatactga aaataattgg gctgtgacat ttgaggaaga tgctcagcgg    2820
aattactcat ggagagataa agggatact gtcaccggac acttggttgt aacacctgta     2880
gtgccagttt atatgtctgt gtgggtagaa gctgaggatg attttgaagt gtctaacttt    2940
tgtgggccac cgactgtaaa gacgaatgat tggaattatg catttctga tgagcatgcg     3000 cgagttcaga tggatgatag tgtagaaaga gtatacgatg agggaaccca gacgtattac    3060
tatccggccc ctaagccgga gggttttagt ttgaacaatg tacggacttc ggttagtacg    3120
ttgtgtaata tgcttgggaa agtagtaact cccgagcgcg caatgaaaac agcgttgtgc    3180
gcaactccct attttgggtc agcttacatg acagctacta ctctggatgc tataggtagt    3240
atgcagaata ccgttacagg agcagcacat cagctgacgg catcagttga tgcgaggtta    3300
gagcaactgt cagctaagtt tggagattca atagatgtaa tcactacagc ggtgaaggag    3360
gctataggta aaatttcttc tggtatgttt aatatggtta attatactgg ttactgtata    3420
gacgtgattt tggatatatt agttgcttgg attgaccgaa gttggactgc agttggagta    3480
ggaattattc gattcgtgac taaggtcttg gggttgggtg caatttctaa agttatgaat    3540
atggctacaa cttttgggca gcttatagct agggtttatg agcctccacg cccagttgtg    3600
caagcaccac ctcctacgga agctacattg actggagctt tggcaggtat attgggtacg    3660
cttatggggg tttatatatc gccattgtct ggaggaagtt actttaaaaa tttgatgctg    3720
aggatgacta gttcggctgg gccgtcttat ttggtgggg tcttacgttt tgtagaggcg     3780
actttcaata cggtcaagga tatgatatta aatgctttgg gttatgtttc tccggagaat    3840
gcggctctga aaatgctatc gggaacatcg gctacgatac agaattttat aactgatgct    3900
cagctcatta ctacagaagc taatgcagca ttggtgggac accctagttt ccgtgctaag    3960
tattggaaca cggtaatgca agcatatcaa atacagaagt tattattgac cgttcctcag    4020
tctagtgcct ctccaatttt atctagattg tgtagtgatg tcatacgtaa tagtaatgaa    4080
aaatttattg atatctcttc ttcaccggta cgttatgaac cttttgtaat ttgtattgag    4140
ggtccagcag gtatcggtaa atcagaaata gtggagaccc tagccactgc attattgaaa    4200
ggagtcaatt taaaacgacc acatagtggg gctacgtatt ttcgaatgcc agggtctcgg    4260
ttttggtctg gttatagaga tcaaccagtg gtggtttatg atgattgggc taatttaacg    4320
gaacctcaag ctttaatgca gcaaatctca gaattatatc agctcaaatc aacttctact    4380
tttatcccgg aaatggctca tttagaagaa aagaagatta gaggtaatcc cctcattgtg    4440
atattattat gtaaccacgc ttttccggat agtgcagtta ctaacatgtc tcttgaaccc    4500
agtgcaattt accgtaggag agatgtgtta ttgtatgcag aaagaaaacc agaatatgag    4560
ggggttagtt taagagacat gagtgttaac gagcaaacta cgtttgctca tttgaatttt    4620
tataagtaca aggattctac taatgcatcc tcatgcacat caaaacctgt tggatatgag    4680
ttgactaagg agtggttggt cgcgaagttt gctaaatggc atgcgcagga acaaattaaa    4740
gtacaaagac gtatggagaa tatacgggca ggaatgtacg atgctgaggt gggatctttg    4800
```

-continued

```
cgtttggaag atccatttag tttatattac tcagtgtcta gtgaagttat tgaaaataat    4860
gaagatgtta cgactgggtt tcttcctagt gaaattttag cattcgaatg taagcgtata    4920
gcaaacgtga tagatgctca tcaatcctcg gtaagggaga ttgtgattcc agatgagcca    4980
agagacccat tgttactac acagggtgat tttgcggggg tatttatggg agctgctttg     5040
ggtcgtgtgg tactggaaaa agtgtgtagc ttttcatcgg aactcatcaa ttatgcgatt    5100
gattggataa ttagtaagca taatgtgatc catgagtgtt gtgtgtgtaa agagacgaag    5160
ggtatagcgt ggtactgcct ggattctgcg caacttgccc ctcaatctac gcattatatg    5220
tgcaatggtt gtatggtagc gtcgcgtgca gcaaatcgag aagtggtaca atgcccgatg    5280
tgtaggagtc caaattttga acgatggggc acataccaac agatgacagg tataactatt    5340
gttgggcgcg cattgatcat gggattgata acagttgata agggagttaa tgtactccgt    5400
cgaatgttgg gaggtacctt tggcgctatg tatgcggcta taatgcgtat agctgctaca    5460
ctccacccct cgatgagtga gagaacagcg gagttgttaa ggatgacagg gccttggtt     5520
gatatgagtg aatatactgt gcgagaattg caacatgtag taacccagat agatgatcca    5580
tttgagtcag gggatgaaga tgatgatgtt ggtactagta aaatacactg gcgtgatatt    5640
gtaacttttg atttcgagga agatgtggct cgctctctga tgcgagagag ggaaattact    5700
aatatacccct gccttcatat attgttgggg ggagctttac accacgtgtc ttatcgtgac    5760
gggggttata atgtacccaa cgggggaact atggtgagag tgccggagtt gccgtgtaca    5820
tcagattgtt acttttctga tatggaagct tttaagagtt ttgcccagcg gtataaggag    5880
gaaaagaaga ttgaaattca gtcctatttg ttaggtttta tcaataatca gcactctcaa    5940
gactattata ggaaacgggt tccacgtgtt tttcagcctt attggatgag agctaatgaa    6000
gagttagctt tagaaattca taatatcact atggataatt ggtatcagag agtcggtgat    6060
tcgtttgcga attacagaac tttgatagtg gcagccgcag gtttagtgat ggcagtggga    6120
agcatatttg gaatgtataa attcttttct attggtacga atccagcgcg tgtagagttc    6180
gttcctagtg gggatgaaat cactagaaat ttgaagcgaa caactagaac attgcaaagg    6240
acccgcacgg agagacctca ttttcaacaa gtacatgaac atccatccct tgattctgtg    6300
gtgaagaagt atgtggctcg taactatatc accattagtt tgtataagcc ggcaggacgt    6360
gtgaaagtta accgcatgtg gtattttatgg gacagtggct ttattaccga ggcattatgt    6420
gccgtgccta ttaaggaggc ctgggaaaag agcttaaaaa taaccataac tccagctctc    6480
ttggagcatg aggagcatgt ctacacttat gatgcagctg atttcactat atctgagtct    6540
acggatttgg ctatttgggt cctgtctcca tcatttggaa tgtttaagga tataaggaag    6600
tttatagcta cagatgagga cctatctaaa ccaattacta cggaagggtc cttattattg    6660
gccccaacta atcgtaaccc agtgcttaag gaacagagta tagagatact gggcctacaa    6720
aatgaaatgc aagtatctga gttaaatggc acagtattct atgcgagtga tgtaatttgt    6780
tatgattatt cacaacaggg agcttgtgga tctctgtgct tcttgtcccg ctcccaaaga    6840
cctattgtgg gaatgcattt tgctggtcga ggtgagggt cctgtggaga aggttatggg      6900
gttattttaa ctaaagaggc tattgggat attttagcat tgaagtctca acctgtggta     6960
cagttggaag attgggaagg acccagttta gaagaagcaa aaataatttt gcctgaaaca    7020
aatgtatctt atattgggc ggtgacaaag gagcagactc cttatctcca caagaaaaca     7080
aagataagac cgagtcttat tcagaatgtc ggtgaccttc atccagtatc agaaccatgt    7140
atattggata aaacagattc taggtaccaa catgatgata ctccctttggt agcggggtgt    7200
```

```
aagaaacatg ggaggcttac cacagatttt ggcactacga gagtagaaag cgctaaagaa      7260
gcccttgggg acgggtggct atcgaagatg aaacccttgg tggtaaaacc caagttatta      7320
acacctgagg aggctgctag tggctttcgt gatataccgt attatgatcc tatgattctc      7380
aatactagcg cgggttttcc ttatgtagca acggaaaaga agcgtaaaga agattatata      7440
gtatttgagc gcaatgaaaa tgagcaacct attggggcaa ctatagaccc cagcgttctg      7500
gaagagatga agcgaaaatc tgaattgaga aggcaagggg tgcagcctat tacaccattt      7560
atcgatacac ttaaggatga gaggaaatta ccagaaaaag tacgcaagta cggtggaact      7620
cgagtatttt gtaacccacc tattgattat attgtgtcga tgaggcaaca ctatatgcac      7680
tttgtggctg catttatgga acagcgtttt aaattaatgc atgctgtggg gattaatgtg      7740
caaagtacag aatggaccct cttggcttct aagttgcttg ctaaaggaaa taatatttgt      7800
actattgatt attcaaattt cggtccaggg tttaatgctc aaatagcaaa agctgctatg      7860
gaattaatgg tgcggtggac tatggagcat gttgagggtg taaatgagat agaagcacac      7920
accttattac atgagtgttt aaattcggtt cacttagtat ctaatacact gtaccaacag      7980
aagtgtggat cacctagtgg agcgcccatt accgtagtga taaatacttt agttaatatt      8040
ttatatattt ttgtagcttg ggagacgcaa gtaggaagta aagaaaaagg gcaaacttgg      8100
gaatctttca aacaaaatat tgaattgttt tgctacggtg atgatttgat aatgtcagtt      8160
acagataaat ataaggaaac ttttaatgcg tt                                    8192
```

<210> SEQ ID NO 5
<211> LENGTH: 18
<212> TYPE: DNA
<213> ORGANISM: Artificial
<220> FEATURE:
<223> OTHER INFORMATION: Synthetic DNA, T7 promoter

<400> SEQUENCE: 5

```
taatacgact cactatag                                                      18
```

INFLUENZA VACCINE COMPOSITION BASED ON NOVEL NUCLEIC ACID

TECHNICAL FIELD

The present disclosure relates to an influenza vaccine composition based on a novel ribonucleic acid having a dual function of serving as an adjuvant and capturing antigens.

Specifically, the present disclosure describes a vaccine composition, in which an influenza antigen is accommodated in a novel hetero-structured ribonucleic acid (hsRNA) adjuvant, and use thereof for preventing or treating influenza virus infection. The novel hsRNA may be defined as having a specific length or sequence selected through an in vivo splenic dendritic cell activation assay. When a vaccine composition, in which the hsRNA is loaded with an influenza antigen, for example, an influenza whole virus antigen or a surface antigen, is administered into the body, e.g., nasally delivered, it is possible to effectively protect death of the individual from fatal infection.

BACKGROUND ART

A) Influenza Virus

Influenza virus (IV) is a virus consisting of 8 single-stranded, negative-sense RNA segments that express 10 to 13 types of proteins, and belongs to the Orthomyxoviridae family. Influenza virus is classified into types A, B, and C according to the antigenic property of nucleoprotein (NP) and matrix (M) protein, which are structural proteins attached on the surface of the virus. In humans, types A and B are known to be mainly pathogenic. Type A is able to infect not only humans, but also pigs and birds. Humans are the only host of Type B.

Influenza virus consists of two surface glycoproteins, i.e., surface antigens, hemagglutinin (H or HA) and neuraminidase. Influenza virus is divided into subtypes according to the type and combination of hemagglutinin, which is an antigenic projection binding to sialic acid which is a receptor of a host cell, and neuraminidase, which cleaves sialic acid to release a sialic acid-bound virus into cells. These subtypes are classified mainly based on type A influenza. Currently, 18 types of hemagglutinin from H1 to H18 and 11 types of neuraminidase from N1 to N11 have been found. By combining them, influenza type A may theoretically have 198 different combinations of subtypes. Influenza B virus is divided into two lineages, Victoria and Yamagata, according to the antigen type.

Influenza has a characteristic that antigenic variation occurs gradually or drastically almost every year, as is typical of RNA viruses. Antigenic drift occurs almost every year mainly on influenza A and B, which are the cause of seasonal epidemic. Therefore, the World Health Organization (WHO) decides and announces the recommended vaccine for the season around February every year by summarizing virus epidemic information. Antigenic drift, which is a point mutation in the same subtype, is a phenomenon in which hemagglutinin or neuraminidase is replaced by a new hemagglutinin or neuraminidase with slightly altered antigenicity through minor antigenic variation. Antigenic shift produces a new virus by changing the subtype such as H3N2→H2N2. In addition to these two variations, variations may occur when cultured in embryonated eggs, which may cause differences in antigenicity. Since such variations were not found in cell culture, vaccines using viruses cultured in mammalian cells are preferred.

Among hemagglutinin and neuraminidase surface antigens, immunity to hemagglutinin is particularly associated with prevention of influenza and severity of the disease. Therefore, the most important component of an influenza vaccine is hemagglutinin, and a neutralizing antibody produced in the body against hemagglutinin plays a critical role in preventing influenza virus infection.

In 1918, human influenza type A virus (H1N1) spread from birds to humans and pigs, causing a pandemic. In 1957, human influenza type A H2N2 appeared. In 1977, human influenza type A virus H1N1 appeared again, and became a virus that is the main cause of seasonal influenza, along with human influenza type A virus H3N2 which appeared in 1968. The novel influenza virus (pandemic influenza H1N1 2009), which has been prevalent worldwide since April 2009, is a newly created influenza virus due to antigenic shift through genetic recombination.

B) Influenza Vaccine

Influenza vaccine should be given annually due to antigenic drift and duration of immunity of less than 1 year. The recommended time for immunization is the period from October to December every year in consideration of the influenza epidemic period, i.e., December to April of the following year, the duration of immunity, i.e., 6 months on average, etc.

Current influenza vaccines include inactivated vaccines and live attenuated influenza vaccines (LAIV). With regard to inactivated vaccines, viruses cultured in fertilized eggs, i.e., embryonated eggs are inactivated with formalin, etc., or viruses proliferated in cell culture are inactivated, surface antigens thereof are harvested, and then intramuscularly injected (i.m.) as a vaccine antigen. Live vaccines are administered by intranasal spraying.

Inactivated vaccines include whole virus vaccines using the whole virus, split vaccines (subvirion) prepared by splitting the virus envelope with ether, etc., subunit vaccines prepared by purifying hemagglutinin and neuraminidase components, etc. Hemagglutinin and neuraminidase are antigens that directly induce neutralizing antibody responses, and hemagglutinin is the major neutralizing antigen. Since whole virus vaccines causes side effects in children, they are not commonly used around the world including Korea currently, and used only in some countries. In contrast, component vaccines such as split vaccines and subunit vaccines are very safe and have been recognized for their efficacy, and thus are used the most frequently.

In addition, to enhance immune responses, vaccines containing adjuvants such as MF-59 or virosome vaccines forming virus-like vesicles have been developed and used in some countries. In particular, it is required to include a strong and safe adjuvant in the vaccine in order to provide a sufficient level of immune defense against influenza virus infection for the purpose of prevention or treatment.

Antibodies against a specific subtype or type of influenza virus, which are obtained through natural infection or vaccines, have problems in that they usually do not form protective antibodies against other types or subtypes of influenza viruses, and do not exhibit sufficient immunogenicity against new variants within one antigen.

Since influenza viruses cause large and small variations every year, the epidemic strain changes every year, and thus it is difficult to expect protection from the vaccination in the previous year. Therefore, there is a difficulty in that the vaccine need to be given annually.

In the development stage of influenza inactivated vaccines, to evaluate new candidate substances, mice are immunized and then attacked with virus to evaluate efficacy and potency of the candidate vaccine by survival rates. Practically, the potency is mainly evaluated by a content of HA among various viral protein antigens included in the vaccine. Currently, it is common that vaccines are prepared to include 15 μg of HA for each subtype. Vaccine efficacy is tested through a challenge test after vaccination of susceptible animals. It is required to submit data that can confirm whether defense responses occurred or to submit data that can confirm whether defense responses equivalent thereto occurred.

In non-clinical immunogenicity studies of vaccines, appropriate immune responses such as humoral and cell-mediated immune responses induced in vaccinated experimental animals should be evaluated. Evaluation is made through seroconversion, geometric mean titer (GMT) of antibodies, cell-mediated immunity, etc., depending on induced immune responses. In non-clinical immunogenicity test for influenza vaccines, antibody titers are mainly determined by the hemagglutination inhibition (HI) in laboratory animals. In other words, it is known that the risk for influenza infection is reduced when the serum HI antibody titers are 1:40 or higher after immunization with the inactivated vaccine, but it is not absolute. It has been suggested that when the HI antibody titers are 1:15-1:65, the disease may be prevented in 50% of subjects, and efficacy rates increase as the titers increase (Hobson D et al, Journal of Hygiene 70:767-777,1972) (de Jong J C et al, Developmental Biology. 115:63-73, 2003). Seroconversion and GMT have been used as measures of vaccine potency (Committee for Proprietary Medicinal Products (CPMP). Note for guidance on harmonization of requirements for influenza vaccines. CPMP/BWP/214/96. The European Agency for the Evaluation of Medicinal Products (EMEA), March 1997) (Treanor J et al, Vaccine. 20:1099-1105, 2002). In addition, the neutralizing antibody titers related to the function of the immune responses need to be also evaluated, and live attenuated vaccines need to be evaluated for mucosal secretory antibodies, cell-mediated immunity, etc. Influenza live vaccines may greatly differ from inactivated vaccines in terms of the immune responses generated after vaccination. This is because live vaccines have lower serum HI antibody titers than inactivated vaccines, but more induce mucosal secretion of secretory antibodies and cell-mediated immune responses. Therefore, the efficacy of the vaccines cannot be predicted by the HI antibody titers generated after vaccination.

Seasonal influenza vaccines currently used provide protective immunity only against virus strains used in the vaccines, and thus development of economical and effective influenza vaccines capable of providing sufficient cross-protective immunity against various subtypes is required. To develop universal vaccines with cross-immunity, it is necessary to use an antigen with minimal antigen variation or to stimulate mucosal immunity. In some cases, one or more HA2 domains of HA with low antigen variation are overlapped and used as a vaccine antigen (Korean Patent No. 10-1637955).

C) Influenza Mucosal Vaccine

Vaccines administered parenterally or intranasally work by inducing anti-hemagglutinin IgG antibodies by penetrating the lower respiratory tract. Both IgA and serum IgG, which are key antibodies of mucosal immunity, are involved in immunity against influenza virus, and in particular, stimulation of mucosal immunity through the nasal passages may effectively prevent upper respiratory tract infections (Clements M. L. et al, J. Clinical Microbiology 24, 157-160, 1986). Moreover, in mice, respiratory IgA plays an important role in defense against influenza infection. An advantage of stimulating the local respiratory IgA response to influenza is that the local respiratory IgA response exhibits more extensive protective immunity than the serological response, thereby also providing cross-protection against viruses with hemagglutinin molecules different from those of vaccine antigens. Therefore, an influenza vaccine that induces anti-hemagglutinin responses both in the local secretory organs and in the serum provides superior immunity, as compared to the current vaccines. In contrast, parenteral vaccine injection (intramuscular injection, subcutaneous injection, etc.) is ineffective in inducing local antibody production unless there is a separate mucosal exposure (i.e., infection). In other words, to stimulate the mucosal immune system, vaccines must be topically applied to the mucosal surface.

Among advantages provided by mucosal administration of influenza vaccines, such as intranasal spraying or instillation, as compared with traditional parenteral methods such as intramuscular, subcutaneous or intravenous administration, the most notable advantage is that the local mucosal immune system of the respiratory tract is more effectively stimulated and vaccination rates may be reconsidered, because of being free from fear and anxiety of needles. Practically, intramucosal administration of an inactivated vaccine with low immunogenicity into the human body induced a stronger antibody response and provided protective immunity than intramuscular administration of a live vaccine or an attenuated vaccine (Kuno-sakai et al, Vaccine 12: 1303-1310, 1994). However, the intramucosal administration method presented in the above paper has a disadvantage in that the vaccine has to be used three times more than the amount used for intramuscular administration into the patient, and thus it has not been commercially used.

To overcome the above problem, there have been other attempts to improve immunogenicity of influenza vaccines when administered orally or intranasally. Examples thereof include a method of using Cholera toxin (CTB) B subunit (Tamura S. et al, Vaccine 6:409, 1988), a method of encapsulating vaccine antigens in various microspheres (Moldoveanu Z et al, J. Inf. Dis. 167: 85-90.1993), or a method of using live attenuated strains (Maassab H. F. et al, Vaccine, Plotkin S. A. and Mortimer F. A. Jr. (eds) W. B. Saunder Philadelphia p435, 1993). However, a practical method capable of enhancing immunogenicity by administering influenza vaccines to the mucous membrane on the route of infection has not yet been developed.

D) Vaccine and Adjuvant

Vaccination or immunization is the most effective way to prevent or treat various diseases, but there are still problems to be overcome. In other words, many vaccines are occasionally ineffective to provide protective immunity, and many vaccines must be administered several times, and their efficacy decreases over time, and thus additional revaccination is sometimes required.

Generally, an adjuvant or immunity-boosting agent per se is not sufficient to induce production of antibodies or cellular responses, and includes single or mixed compounds or live agents that increase immunogenicity of an antigen. Alternatively, some adjuvants are formulated to reduce immunogenicity and side effects. Overall, adjuvants provide a moderately strong and consistently robust, antigen-specific enhanced immune response in a variety of ways, for example, promoting antigen presentation of the immune system, reducing a requirement dose of antigen, and providing an additional benefit of avoiding multiple injections.

Innate immune cells recognize abnormal patterns or danger signals from invading infectious pathogens or vaccinated antigens, and transmit them to the adaptive immune system. The intrinsic qualitative and quantitative signals of the adaptive responses are amplified depending on the level and specificity of the patterns, demonstrating importance of the innate immunity in the adaptive immune responses. An adjuvant vaccine composition is one of the most effective and cost-efficient ways to prevent or treat a disease.

To effectively customize a vaccine, a stronger and safer adjuvant should be included in the vaccine composition. Such a novel adjuvant provides many advantages, such as broad responses to various antigens, induction of effective humoral and cellular immune responses, neutralization, in particular, killing of pathogens. In addition, adjuvants of adjuvant vaccines may help reduce a requirement dose of antigen and provide cross-protective and long-lasting immune responses during aging.

E) Double-Stranded Ribonucleic Acid which is a TLR3 Ligand in Innate Immunity

Dendritic cells are derived from hematopoietic bone marrow progenitors of the bone marrow, and initially differentiated into immature dendritic cells, characterized by high endocytic activity and low T-cell activation potential. Immature dendritic cells constantly monitor the environment for viruses and bacteria, which is achieved through pattern recognition receptors (PRRs) such as TLRs. Virus infection and pathogenicity of double-stranded ribonucleic acid to single-stranded ribonucleic acid or abnormal ribonucleic acid may serve as a danger signal. TLR recognizes specific chemical markers found in a group of pathogens, and when dendritic cells encounter antigens, they are activated to mature dendritic cells, which begin migration to lymph nodes. Immature dendritic cells phagocytose pathogens, and upon maturation, present fragments at their cell surface using major histocompatibility complex (MHC) molecules. Simultaneously, they greatly enhance, on their surface, expression of T-cell activation co-stimulating factors such as CD80 (B7.1), CD86 (B7.2), and CD40 that activate T cells. Dendritic cells also upregulate CCR7, which is a material that induces the dendritic cells to travel to the spleen or lymph nodes. Here, dendritic cells act as antigen-presenting cells to present antigens, and activate helper T cells, and killer T cells and B cells.

As described above, dendritic cells play an important role in innate and adaptive immune responses, which is attributed to maturation of dendritic cells (DCs) characterized by increased expression of co-stimulatory factors, pro-inflammatory cytokine production, and antigen presentation. Different subsets of dendritic cells display different specific functions. CD8α-positive classical dendritic cells (cDCs) have a selective ability to cross-present intracellular antigens via MHC class I. This function is important for generation of CTLs against virus antigens or nuclear antigens from cells during necrosis. In contrast, extracellular antigens are captured and transported to endosomes/lysosomes of CD8α-negative cDCs, where the antigens are degraded into antigenic peptides, complexed with MHC class II molecules, and recognized by CD4 T cells. During maturation of dendritic cells, antigen-loaded dendritic cells spontaneously migrate to secondary lymph nodes and acquire the ability to stimulate T cells. These dendritic cells produce CD4 helper T cells that produce specific types of cytokines and pro-inflammatory cytokines that critically influence the induction of CD8 CTLs.

To induce tumor antigen-specific CTL activation in a tumor vaccine, the tumor antigen must be cross-presented by CD8α-positive dendritic cells. In addition, CD4 T cell activation induced by mature CD8α-negative dendritic cells is required. CD8α-negative cDCs, which are a major population of mouse spleen, have a selective ability to directly present extracellular antigens to CD4 T cells. Pathogen-derived substances or immunity-boosting agents at the site of infection or immunization activate dendritic cells to induce expression of co-stimulatory factors and cytokines, which act together with the MHC-antigen complex to differentiate cognate T cells into antigen-specific CTLs and helper T cells.

TLR3 is normally expressed in endosomal compartments on myeloid dendritic cells (mDCs), B cells, mononuclear cell-derived macrophages, and many tumor tissues, and detects a double-stranded ribonucleic acid of virus, which is a hallmark of viral infection or replication, in infected cells. When the double-stranded ribonucleic acid is recognized by TLR3, MDA-5, NLRP3, it stimulates type I interferon and pro-inflammatory cytokines. When mDCs are activated into mature antigen-presenting cells (mAPCs), antigen epitopes are loaded onto MHC-1 molecules and presented to naive T cells. Activation of dendritic cells by TLR3 enzyme not only contributes to induction of innate and adaptive immune responses against microbial pathogens, but also stimulates anti-tumor CD8+ T cells to promote natural killer (NK) cell activation and tumor cell death.

F) Single-Stranded Ribonucleic Acid Acting as a TLR7 Ligand in Innate Immunity

Single-stranded ribonucleic acid oligonucleotides containing (preferably enriched in) guanosine (G) and uridine (U) may originate from an invading pathogen, which stimulate dendritic cells and macrophages to secrete interferon alpha, pro-inflammatory cytokines, and regulators. They were found to be recognized by TLR7 and TLR8. TLR7 detects single-stranded ribonucleic acids and induces NF-kappa-B activation, cytokine secretion and inflammatory responses via MYD88 and TRAF6 in innate immunity. Much like TLR3 and TLR9, TLR7 and TLR8 are also commonly expressed on endosomal membranes. TLR7 also responds to chemical ligands (e.g., imidazoquinoline). According to crystal structure studies, TLR7 is a dual receptor for a single-stranded ribonucleic acid containing guanosine and uridine. In TLR7, a first conserved ligand binding site is used for small ligand binding and a second site is used for single-stranded ribonucleic acid binding. It is known that the first site preferentially detects guanosine while the second site binds specifically to the uridine moiety of single-stranded ribonucleic acid.

Since the current seasonal influenza vaccines provide protective immunity only against virus strains used in the vaccines, the development of economical and effective influenza vaccines capable of providing sufficient cross-protective immunity against various subtypes is required.

To develop universal vaccines with cross-immunity, it is necessary to use an antigen with minimal antigen variation or to stimulate mucosal immunity. In some cases, one or more HA2 domains of HA with low antigen variation are overlapped and used as a vaccine antigen (Korean Patent No. 10-1637955).

PRIOR ART DOCUMENTS

Patent Documents (Patent Document 1) Korean Patent NO. 10-1637955

DESCRIPTION OF EMBODIMENTS

Technical Problem

The present disclosure provides an influenza vaccine with enhanced versatility.

Seasonal influenza vaccines currently used provide protective immunity only against virus strains used in the vaccines, and thus development of economical and effective influenza vaccines capable of providing sufficient cross-protective immunity against various subtypes is required.

An object of the present disclosure is to provide a novel universal influenza vaccine preparing for the emergence of new variants of influenza viruses by providing protective immunity against not only the same subtype as an antigen used in the vaccine, but also various subtypes of influenza A viruses different therefrom.

Solution to Problem

The present disclosure provides a vaccine composition for preventing or treating influenza virus infections, based on a novel hetero-structured ribonucleic acid (hsRNA) as an adjuvant.

Specifically, the present disclosure provides a vaccine and a pharmaceutical composition, in which the whole virus of an inactivated influenza virus or a surface antigen thereof is loaded on hsRNA having a novel structure, thereby providing protective immunity against a homotypic virus as well as a heterosubtypic virus. In particular, the vaccine composition of the present disclosure exhibits a robust and safe protective effect, particularly, when administered intranasally.

The hsRNA may be defined as having a specific length or sequence selected through an in vivo splenic dendritic cell activation assay. When the vaccine composition, in which the novel hsRNA is loaded with an influenza antigen, for example, an influenza whole virus or a surface antigen, is administered into the body, e.g., when intranasally administered, it is possible to effectively protect death of the individual from fatal infection.

In one embodiment, the present disclosure provides a vaccine composition for preventing or treating influenza type A virus infection, the vaccine composition including a hetero-structured ribonucleic acid (hsRNA) including a double-stranded ribonucleic acid (dsRNA) and single-stranded ribonucleic acids (ssRNAs); and a human influenza type A antigen, in which the dsRNA is formed by complementary binding between a first single-stranded RNA and a second single-stranded RNA which are complementary to each other, the ssRNAs are linked at both the 3'-ends of the dsRNA, respectively.

The hsRNA may have 140 to 1682 nt, 200 to 1500 nt, 300 to 1000 nt, 400 to 900 nt, or 600 to 900 nt in length. The dsRNA region may act as a TLR 3 ligand. The dsRNA may have 106 to 1648 nt, 200 to 1500 nt, 300 to 1000 nt, 400 to 900 nt, or 600 to 900 nt in length.

The ssRNA region may have 1 to 100 nt, 1 to 90 nt, 1 to 80 nt, 1 to 70 nt, 1 to 60 nt, 1 to 50 nt, 1 to 40 nt, 1 to 30 nt, 1 to 20 nt, 1 to 20 nt, 1 to 15 nt, 1 to 10 nt, 1 to 8 nt, 1 to 6 nt, 2 to 100 nt, 2 to 90 nt, 2 to 80 nt, 2 to 70 nt, 2 to 60 nt, 2 to 50 nt, 2 to 40 nt, 2 to 30 nt, 2 to 20 nt, 2 to 10 nt, 2 to 8 nt, 2 to 6 nt, 3 to 100 nt, 3 to 90 nt, 3 to 80 nt, 3 to 70 nt, 3 to 60 nt, 3 to 50 nt, 3 to 40 nt, 3 to 30 nt, 3 to 20 nt, 3 to 10 nt, 3 to 8 nt, 3 to 6 nt, 15 to 80 nt, or 17 to 75 nt in length. For example, the ssRNA region may have 1 nt, 2 nt, 3 nt, 4 nt, 5 nt, 6 nt, 7 nt, 8 nt, 9 nt, or 10 nt in length.

Further, the hsRNA may not be a homo-polyribonucleotide. The hsRNA may not be a PolyIC, PolyIC-L-lysine, PolyIC-L-lysine-methylcellulose, poly (I:C12U), or combination thereof. The ssRNA regions may not or substantially not be complementary to each other.

In the hsRNA, the first strand may have a completely complementary nucleotide sequence with that of the second strand. The first strand may have completely complementary ribonucleotides without a gap with that of the second strand. The dsRNA region may not have a secondary structure such as stem-and-loop structure. The dsRNA region may not have a nick.

The hsRNA or dsRNA region is not designed to have RNAi or antisense inhibition activity. The hsRNA may comprise two strands of ssRNA, and each strand of the ssRNA may be a separate molecule.

The dsRNA region may have no more than 5%, 10%, 15%, 20%, 25%, 30%, 35%, or 40% sequence identity with a naturally-existing human gene. The hsRNA or dsRNA region may not encode a protein.

The dsRNA region may be derived from non-human organisms. The non-human organism may be a virus, prokaryotic cell, or eukaryotic cell. The prokaryotic cell may include bacterial cells. The dsRNA region may be derived from an artificial sequence, a vector sequence, a viral sequence, or a plant genome. The artificial sequence may consist of any partial sequences. The vector sequence may be the pDM-18T. The viral sequence may be a nucleotide sequence encoding Sacbrood virus VP1. The hsRNA or dsRNA may be derived from the VP1 gene of Chinese Sacbrood virus strain BJ 2012. The VP1 gene may have the nucleotide sequence of SEQ ID NO: 4.

The artificial sequence may be an arbitrarily synthesized sequence. The plant genome may be a nucleotide sequence encoding tomato EPSP-1 protein. The eukaryotic cell may be a fungal cell such as yeast, plant cell, and animal cell. The hsRNA or dsRNA region may be an artificially synthesized or recombinant dsRNA. The hsRNA may be a dsRNA having two 3'-overhangs. The hsRNA may be an isolated dsRNA, which is not present in nature.

In the hsRNA, the ssRNA may be formed by contacting a pre-hsRNA with an endoribonuclease. The endoribonuclease may be an enzyme specifically cleaving the ssRNA region. The endoribonuclease may not be an enzyme cleaving dsRNA region. The endoribonuclease may be an enzyme specifically cleaving ssRNA region and does not or substantially not cleave dsRNA region. The ssRNA region may be formed by cleaving the ssRNA region with a longer length with endoribonuclease and has reduced length. The ssRNA region may be residual sequence after cleavage with the endoribonuclease. The endoribonuclease may be RNase 1. The RNase 1 is an endoribonuclease that specifically cleaves single-stranded RNA at G residues. It may cleave the phosphodiester bond between the 3'-guanylic residue and the 5'-OH residue of adjacent nucleotides. The reaction products may be 3'-GMP and oligonucleotides with a terminal 3'-GMP.

The ssRNA region may have a UAUAG sequence at the 3'-end of each ssRNA region.

The hsRNA may be obtained by contacting a pre-hsRNA having two 3'-overhangs with endoribonuclease to reduce the length of the ssRNA region. The two ssRNA regions may have identical lengths.

The hsRNA may independently have triphosphate, diphosphate, or monophosphate at its 5'-end. For example, the hsRNA may have a triphosphate at its both 5'-ends. The hsRNA may independently have a hydroxyl group at its 3'-end. For example, the hsRNA may have hydroxyl groups at both 3'-ends. The first strand and the second strand are disposed on separate RNA molecules.

The hsRNA, which is formed resulting from complementary binding between a nucleotide sequence of SEQ ID NO: 1 and a nucleotide sequence of SEQ ID NO: 2, may have a length of 533 nucleotides. In the specific hsRNA, the dsRNA region may have a nucleotide sequence of SEQ ID NO: 3 having a nucleotide length of 424 bp. Further, the hsRNA may be obtained by cleaving, with endoribonuclease, e.g., RNase 1, pre-hsRNA which is formed resulting from complementary binding between the nucleotide sequence of SEQ ID NO: 1 and the nucleotide sequence of SEQ ID NO: 2. The hsRNA may have, for example, a 5 nt 3'-overhang at both ends of the dsRNA having a nucleotide length of 424 bp, which is formed by the nucleotide sequence of SEQ ID NO: 3 and a complementary nucleotide sequence thereof. The 3'-overhang may have a UAUAG sequence. The hsRNA having the 5 nt 3'-overhang UAUAG sequence at both ends of the dsRNA having a nucleotide length of 424 bp, is also abbreviated to "NA" herein.

The RNA selected in the present disclosure exhibits strong mucosal immune activation. When the hsRNA of the present disclosure is used as a vaccine adjuvant via a common route of administration, for example, nasal spraying, strong cross-protective immunity effects against homotypic and heterosubtypic viruses may be obtained.

The vaccine composition may be formulated as an oral or injectable solution. The pharmaceutical composition may be formulated in an oil-in-water emulsion.

The vaccine composition may be administered by intravenous injection, intratumoral injection, subcutaneous injection, intraperitoneal injection, intracranial injection, intrathecal injection, intrastriatal injection, intranasal injection, or intracerebroventricular injection.

The vaccine composition may include the hsRNA in the amount of about 5 ug to 150 mg/single dose. The vaccine composition may be aqueous solutions or suspensions. The vaccine composition may be buffered nucleic acid solutions, such as solutions including the hsRNA in a suitable concentration for example, from 0.001 to 400 mg/ml, from 0.005 to 200 mg/ml, 0.01 to 200 mg/ml, 1.0-100 mg/ml, 1.0 mg/ml or 100 mg/ml and an aqueous buffer such as: phosphate-buffered saline.

The strongly negatively charged RNA such as the hsRNA might effectively receive many large antigens to make a nanocomplex comparable to a virus-like particle (VLP). The nanocomplex encapsulating the antigen in an appropriate formulation may be captured by dendritic cells or macrophages, resulting in an effective presentation of antigens to B cells and T cells.

The vaccine composition of the present disclosure may be administered to the mucosa through intranasal administration. At this time, the RNA represents the role of a strong and safe immunity-boosting agent, i.e., adjuvant.

The influenza virus may be influenza virus A, B or C. The human influenza virus antigen may be an inactivated or live attenuated influenza whole virus, a subvirion, or a subunit antigen.

The human influenza virus antigen may be a human influenza virus type A antigen. The human influenza virus type A antigen may be the influenza whole virus or surface antigen. For example, the human influenza antigen may be an inactivated or live attenuated influenza whole virus, or a surface antigen, which may be part or all of hemagglutinin or neuraminidase. The hemagglutinin or neuraminidase may be extracted from a whole virus growth solution or may be expressed by a recombinant method and purified.

The vaccine composition of the present disclosure may exhibit protective immunity effects against homotypic influenza viruses as well as heterosubtypic viruses of human influenza antigens. In particular, when delivered intranasally, strong and safe protective effects were achieved.

In one embodiment, the human influenza type A antigen may be a human influenza type A H1N1 or H3N2 virus antigen. For example, the vaccine composition including the hsRNA and the human influenza type A H1N1 antigen may prevent or treat not only the human influenza type A H1N1 virus but also other subtypes or types of viruses. Other subtypes or types of viruses may be different strains such as human influenza type A H3N2, or human influenza type B or C virus, or each strain thereof.

In a specific exemplary embodiment, when the inactivated A/H1N1 influenza virus (IV) vaccine complexed with or incorporated into the hsRNA adjuvant of the present disclosure was administered via an intranasal route (i.n.), mortality of an individual may be prevented from a lethal dose of homotypic A/H1N1 influenza virus infection. In another exemplary embodiment, when the same vaccine is intranasally administered, mortality of an individual may be prevented from a lethal dose of heterosubtypic (e.g., A/H3N2) infection.

Still another aspect provides a method of immunizing a subject against an influenza virus, the method including administering the vaccine composition to the subject.

The hsRNA is described as above. The administering may include administering via oral or parenteral route. The parenteral route may include intravenous, intracranial, intrathecal, intrastriatal, intracerebroventricular, intranasal, intra-tumoral, intramuscular, intraperitoneal, or mucosal route. The administration may be performed once or twice or more. When the administration may be performed twice or more, the administration interval and dose may vary depending on the subject's age, body weight, sex, etc. When the administration may be performed twice or more, the administration interval may be 1 week, 2 weeks, 3 weeks, 4 weeks, 5 weeks, 6 weeks, 7 weeks, 8 weeks, 3 months, 4 months, 5 months, 6 months, 7 months, 8 months, 9 months, 10 months, 11 months, or 12 months.

The term "therapeutically effective amount" used herein may refer to an amount sufficient to immunize the subject. The "therapeutically effective amount" may be 10 ug to 150 mg, 50 ug to 150 mg, 100 ug to 150 mg, or 150 ug to 150 mg/kg body weight/day. The "therapeutically effective amount" may be 10 ug to 60 ug/each subject.

The subject may be a mammal. The mammal may be a human, a horse, a dog, a cow, a pig, a cat, a chimpanzee, or a monkey.

In the method, the ssRNA region may have a UAUAG sequence at the 3'-end. The hsRNA may be obtained by complementary binding between the nucleotide sequence of SEQ ID NO: 1 and the nucleotide sequence of SEQ ID NO: 2, or may have the UAUAG sequence at both 3'-ends of dsRNA which is obtained by complementary binding between the nucleotide sequence of SEQ ID NO: 3 and a complementary sequence thereof.

The influenza virus may be influenza virus type A, B or C. The human influenza virus antigen may be an inactivated or live attenuated influenza whole virus, a subvirion, or a subunit.

The administration may be administration via a mucous membrane. The mucous membrane may be the nasal cavity. The administration may be performed, for example, via nasal spraying.

The method may provide a protective immunity against the human influenza virus, different subtypes of the homotypic viruses of the human influenza virus, or subtypes of the heterotypic viruses of the human influenza virus.

In the method, the human influenza virus antigen may include one subtype virus antigen of type A influenza virus, one subtype virus antigen of type B influenza virus, or a combination thereof.

The human influenza virus antigen may be an H1N1 subtype antigen of type A influenza virus without including other subtype antigens of type A influenza virus, or may be an H3N2 subtype antigen of type A influenza virus without including other subtype antigens of type A influenza virus.

The human influenza virus antigen may be a BV subtype antigen of type B influenza virus without including other subtype antigens of type B influenza virus, or may be a BY subtype antigen of type B influenza virus without including other subtype antigens of type B influenza virus.

Advantageous Effects of Disclosure

A vaccine composition of the present disclosure, in which an antigen (Ag) is loaded on a hetero-structured ribonucleic acid (hsRNA), not only stimulates strong innate immunity, but also efficiently delivers the antigen complex into antigen-presenting cells, thereby effectively presenting the antigen to T cells and B immune cells, leading to enhancement of specific adaptive immunity. Accordingly, the vaccine composition of the present disclosure may effectively protect from infections of both homotypic influenza virus and heterosubtypic influenza virus even with one intranasal spraying, thereby inducing excellent cross-protective immunity.

BRIEF DESCRIPTION OF DRAWINGS

FIGS. 1A to 1C show a 100% protective effect of an NVT-adjuvanted inactivated A/H1N1 influenza virus (IIV) (iPR8) vaccine according to Example 1, which was confirmed upon challenge with a lethal dose of a homotypic live influenza virus (LIV) (PR8), after single intranasal administration (i.n.) of the vaccine, wherein FIG. 1A shows the experimental schedule, FIG. 1B shows changes in the body weight of mice after viral challenge, FIG. 1C shows survival rates (%) up to 11 days after virus challenge; and FIGS. 2A and 2B show a protective effect of an NVT-adjuvanted inactivated A/H1N1 influenza virus (IIV) (iPR8) vaccine according to Example 2, which was confirmed upon challenge with a lethal dose of a heterosubtypic (A/H3N2) live influenza virus, after single intranasal administration (i.n.) of the vaccine, wherein FIG. 2A shows the experimental schedule, and FIG. 2B shows survival rates (%) up to 14 days after virus challenge;

FIG. 3 shows results of measuring IgA levels in the bronchoalveolar lavage fluid (BALF), the nasal lavage fluid, and the serum, after administration of a vaccine including hsRNA and iPR8 antigen;

FIG. 4A shows results of measuring cell and lymphocyte levels in BALF, after administration of the vaccine including hsRNA and iPR8 antigen;

FIG. 4B shows CD4+ T cell and IFNγ+T cell levels in BALF, after administration of the vaccine including hsRNA and iPR8 antigen, and IFNγ+T cell levels after 72 hours;

FIG. 5 shows results of measuring CD4+ IFNv+ T cell levels in the lung, IgG levels in the serum, and IgA levels in the nasal lavage fluid, after administration of a vaccine including hsRNA and inactivated H3N2 or B virus;

FIG. 6 shows results of measuring the body weight according to days after intramuscular and intranasal administration of a vaccine including H3N2 antigen, or a vaccine including hsRNA and H3N2 antigen, respectively and survival rates according to challenges of a different subtype of H1N1 virus;

FIG. 7 shows results of measuring CD4+ IFNv+ T cell levels in the lung and spleen, after intramuscular injection and nasal spraying of a vaccine including inactivated H3N2 antigen, or a vaccine including inactivated H3N2 antigen or hsRNA, followed by challenge administration of H3N2 or H1N1 virus;

FIG. 8 shows results of measuring the body weight according to days after intramuscular administration and nasal spraying of a vaccine including BV antigen, a vaccine including BY antigen, or a vaccine including hsRNA and BY antigen, respectively and survival rates according to challenges of a different subtype of BV virus;

FIG. 9 shows results of measuring CD4+ IFNv+ T cell levels in the lung, after intramuscular injection and nasal spraying of a vaccine including inactivated BV antigen, a vaccine including inactivated BY antigen, a vaccine including inactivated BV and hsRNA, or a vaccine including inactivated BY antigen and hsRNA, respectively, followed by challenge administration of a different subtype of BV or BY virus;

FIG. 10A shows results of measuring CD4+ T cell levels in the lung and spleen upon challenge administration of H1N1 virus after removing CD4 T cells from mice which had been subjected to nasal spraying of the vaccine including hsRNA and H3N2 antigen;

FIG. 10B shows percent survivals according to days upon challenge administration of H1N1 virus after removing CD4 T cells from mice which had been subjected to nasal spraying of the vaccine including hsRNA and H3N2 antigen;

FIG. 11A shows results of measuring antibody titers by measuring HAI titers after immunization with each vaccine composition;

FIG. 11B shows results of measuring CD4+ T cell levels in the lung and spleen upon challenge administration of H1N1 virus, after intramuscular administration of a vaccine including monovalent H3N2 in PBS, after nasal spraying administration, to a subject, of a vaccine prepared by mixing hsRNA and monovalent H3N2 in PBS, after intramuscular injection, to a subject, of a vaccine prepared by mixing H3N2 antigen, PolyIC, and AddaVax in PBS;

FIG. 11C shows percent survivals according to days upon challenge administration of H1N1 virus to mice which had been subjected to nasal spraying administration of the vaccine including hsRNA and H3N2 antigen;

FIG. 12A shows results of measuring HAI titers after intramuscular and intranasal spraying administration of a Teratect prefilled syringe (Influenza split vaccine) vaccine, or a vaccine including hsRNA and the Teratect prefilled syringe (Influenza split vaccine) vaccine, respectively; and FIG. 12B shows results of measuring CD4+ IFNv+ T cell levels in the lung after intramuscular and nasal spraying administration of the Teratect prefilled syringe (Influenza split vaccine) vaccine, or the vaccine including hsRNA and the Teratect prefilled syringe (Influenza split vaccine) vaccine, respectively.

BEST MODE

Hereinafter, the present disclosure will be described in detail with reference to exemplary embodiments for better understanding. However, the following exemplary embodiments are only for illustrating the present disclosure, and the scope of the present disclosure is not limited to the following exemplary embodiments. It is apparent to those skilled in the art that various changes and modifications are possible within the scope and spirit of the present disclosure, and it is also obvious that these changes and modifications belong to the accompanying claims.

Example 1

Preparation of hsRNA and Examination of protective immunity effect by intranasal administration of hsRNA-adjuvanted inactivated influenza (iPR8) vaccine
1. Preparation of hsRNAs Having Two 3'-Overhangs The hsRNAs having dsRNA region and two 3'-overhangs at each strand of the dsRNA region are prepared as follows. The dsRNA region has the nucleotide sequence of SEQ ID NO: 3, and the complementary sequence thereof and each of 3'-overhang has 5 nt sequence UAUAG. The hsRNA is also referred as NexVant or NVT.

A template DNA molecule comprising a template DNA region and T7 promoter sequences linked to both 5'-ends of the template DNA region was prepared. The template DNA region has the nucleotide sequence of SEQ ID NO: 4, which corresponds to the nucleotide sequence of Sacbrood virus VP1 gene and T7 promoter has the nucleotide sequence of SEQ ID NO: 5. The template DNA molecule was ligated to PUC19 vector (Thermo Fisher, Cat SD0061) digested with SmaI, to form a recombinant vector comprising the template DNA molecule. The recombinant vector was introduced into *E. coli* DH5a by a transformation. The transformed cells were grown in LB/Amp medium. The cells were isolated from the supernatant of the culture. The cells were lysed by using an alkaline solution, and the recombinant vector was isolated by using Qiagen midi prep kit.

The template DNA molecule was amplified by a PCR using the recombinant vector as a template. The obtained template DNA molecule was used in in vitro transcription (IVT) using T7 polymerase as a template. In the PCR, an oligonucleotide set, wherein each oligonucleotide has a complementary sequence to a target to be amplified and the T7 promoter sequence at its 5'-end was used as primer set. PCR was conducted at 95° C., and 5 minutes, and 35 thermal cycles of 95° C., and 30 seconds and 60° C., 30 seconds and 72° C., 1 minute. The reaction mixture was incubated at 72° C. and 5 minutes.

In vitro transcription was conducted using the MEGAscript™ T7 Transcription Kit (Thermo Fisher, cat AMB13345) according to the manufacturer's protocols. The amplified template DNA molecule was used as a template. 1 ml reaction mixture comprising 10 ug linearized Template DNA, 75 mM NTP, 90 mM Tris base, 90 mM Boric acid, 2 mM EDTA, and T7 RNA polymerase 50 ul was incubated at 37° C. for 4 hours. The obtained reaction mixture was incubated at 80° C. for 20 minutes and cooled to room temperature for 30 minutes. The first single-strand RNA and the second single-strand RNA are simultaneously synthesized from each of the template DNA strands and hybridizes to form double-stranded RNAs having two 3'-overhangs.

The reaction mixture was centrifuged at 20° C., 4000 rpm for 3 minutes to remove white precipitation and obtain a supernatant solution. DNase I was added to the supernatant solution, and the resultant solution was incubated at 37° C. for 13 hours. The hsRNA was isolated from the reaction solution. As a result, the hsRNAs shown having 533 nt in length, i.e., 424 nt of dsRNA region, and 51 nt of first 3'-overhang, and 58 nt of second 3'-overhang.

Further, RNase T1 was added to the DNase I-treated reaction mixture, and the resultant mixture was incubated at 37° C. for 2 hours. Then, the reaction mixture was incubated at 80° C. for 10 minutes and cooled to room temperature for 30 minutes. Then, the hsRNA having 3'-overhangs with reduced length was isolated by a nucleic acid precipitation method using isopropanol.

The isolated hsRNA has 3'-overhangs with 5 nt in length, which is shorter than that of the DNase I-treated hsRNA. The hsRNA have UAUAG sequence at its 3'-end of the 3'-overhang and 424 nt of dsRNA region of SEQ ID NO:3. The hsRNA may have phosphate at its 5'-end and a hydroxyl group at its 3'-end. This hsRNA hereinafter referred to as "NA" hsRNA. The phosphate may be triphosphate, diphosphate, or monophosphate. The hsRNA may not have 5'-cap.

2. Examination of Protective Immunity Effect by Intranasal Administration of hsRNA NVT-Adjuvanted Inactivated Influenza (iPR8) Vaccine In this section, a vaccine including the hsRNA NVT)-adjuvanted inactivated A/H1N1 influenza virus (IIV) iPR8 prepared in section 1 was intranasally administered, and a protective immunity effect of the vaccine on lethality of homotypic virus infection was examined.

In this example, the hsRNA and inactivated whole iPR8 were solubilized in PBS (pH 7.2), and the hsRNA in PBS was injected into the mouse via nasal injection, i.e., spraying in the nasal cavity. PolyIC (InvivoGen, Poly(I:C) (HMW) VacciGrade™ cat #, vac-pic) was used as a positive control.

Each substance was administered to mice according to dosing schedules shown in Table 1 and FIG. 1A. In detail, female Balb/c mice (7 week-old, 5 each) were anesthetized and intranasally administered once with PBS (50 µl), 0.5 µg of iPR8±5 µg of NVT, or 0.5 µg of iPR8+5 µg of Poly(I:C). Three weeks later, mice were challenged with 100 times ($100MLD_{50}$) the lethal dose of PR8 (A/H1N1), which is a mouse-adapted live influenza virus. Changes in the body weight (%) and survival rates (%) of the mice were monitored until 11 days after challenge. The results are shown in FIGS. 1B and 1C.

TABLE 1

| | Dosing substance | PR8 challenge | Survival rate (on day 11) |
|---|---|---|---|
| Normal control group | PBS (50 µl) | — | 100% |
| Experimental group | iPR8 (0.5 µg) + NA (5 µg) | Challenge | 100% |
| Control group 1 | PBS (50 µl) | Challenge | 0% (all dead on day 7) |
| Control group 2 | iPR8 (0.5 µg) | Challenge | 40% |
| Control group 3 | iPR8 (0.5 µg) + Poly(I:C) (5 µg) | Challenge | 80% |

As shown in FIGS. 1B and 1C, when only PBS was pre-administered and then PR8 was challenged (Control group 1), 100% died until day 7 after challenge, whereas an experimental group according to the present disclosure challenged with PR8 after pre-administration with iPR8+ NVT showed 100% survival, and its weight gain was also recovered to nearly 100% on day 11. When only iPR8 was pre-administered and then PR8 was challenged (Control group 2), only 40% survived, and the weight gain of the surviving mice was also reduced. When iPR8+Poly(I:C) was pre-administered and then PR8 was challenged (Control group 3), only 80% survived, and the weight gain of the surviving mice was also slightly reduced.

The above results confirmed that a single intranasal administration of the hsRNA, e.g., hsRNA NVT-adjuvanted inactivated influenza (iPR8) vaccine protected all, i.e., 100% mice even when a lethal dose of the homotypic live influenza virus was challenged, indicating that the hsRNA, e.g., hsRNA NVT-adjuvanted vaccine of the present disclosure provides complete protective immunity against influenza virus infection. Furthermore, it was confirmed that NVT provides better protective immunity than Poly(I:C).

Example 2

Cross-protective immunity effect on heterosubtypic virus by intranasal administration of NVT-adjuvanted inactivated influenza (iPR8) vaccine of the present disclosure In the present exemplary embodiment, it was tested whether the vaccine including the hsRNA, e.g., hsRNA NVT-adjuvanted inactivated A/H1N1 influenza virus (IIV) iPR8 of the present disclosure is able to provide a cross-protective immunity against heterosubtypic strains.

Figure 2A:
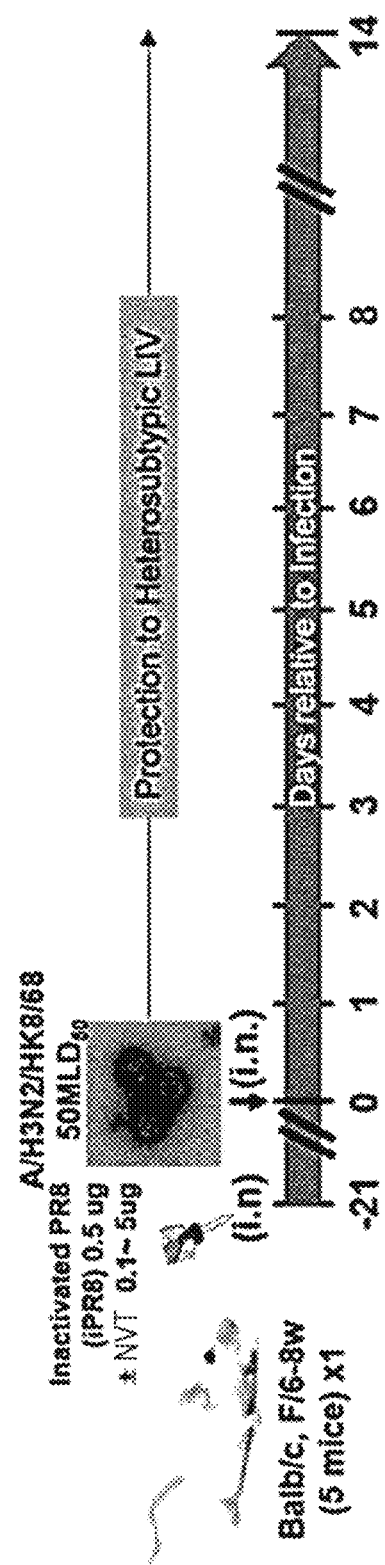

Each substance was administered to mice according to dosing schedules shown in Table 2 and FIG. 2A. In detail, female Balb/c mice (7 week-old, 5 each) were anesthetized and intranasally administered once with PBS (50 µl) or 20 µl of 0.1 µg to 5 µg of NVT+0.5 µg of iPR8. Three weeks later, mice were challenged with a dose of $50MLD_{50}$ of A/Hong Kong/8/68 (A/H3N2) which is a mouse-adapted live influenza virus. Survival rates (%) were monitored until 14 days after challenge. The results are shown in Table 2 and FIG. 2B.

TABLE 2

|  | Dosing material | A/H3N2 challenge | Survival rate (on day 14) |
|---|---|---|---|
| Normal control group | PBS (50 µl) | — | 100% |
| Control group | PBS (50 µl) | Challenge | 30% |
| Experimental group 1 | iPR8 (0.5 µg) + NA (0.5 µg) | Challenge | 60% |
| Experimental group 2 | iPR8 (0.5 µg) + NA (2.5 µg) | Challenge | 60% |
| Experimental group 3 | iPR8 (0.5 µg) + NA (5 µg) | Challenge | 100% |

Figure 2B:
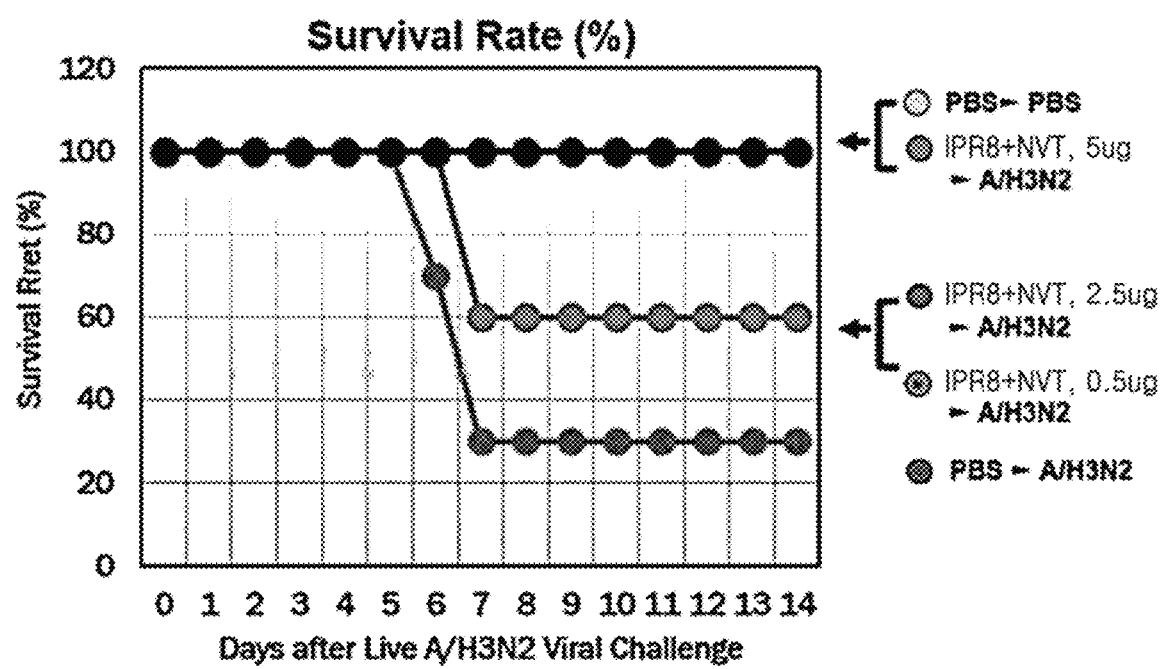

As shown in Table 2 and FIG. 2B, iPR8+NVT combination also exhibited a cross-protective immunity effect against the heterosubtypic influenza virus A/H3N2. In particular, the vaccine including 5 µg of NA exhibited a 100% protective effect.

Example 3: Efficacy of Vaccine Including hsRNA and Influenza Virus Antigen in Mouse 1. Vaccine Formulation and Administration In this section, the hsRNA and inactivated A/H1N1 influenza virus (IIV) iPR8 antigen prepared in Example 2 were solubilized in PBS (pH 7.2) to prepare a vaccine composition including hsRNA. In this regard, the iPR8 antigen and hsRNA were mixed at a ratio of 1:1 to 1:10, based on the weight. The total weight of the iPR8 antigen was 10 µg to 60 µg per person. The prepared vaccine composition including hsRNA was stored at 4° C. to 8° C. Immunization was conducted by spraying half of a total of 100 µl to 500 µl of the vaccine composition including hsRNA into each nostril.

2. Effect on IgA Production

As in the section 1 above, the vaccine was administered to mice by nasal spraying, and the booster was administered in the same manner once more for two weeks. After two weeks, bronchoalveolar lavage fluid (BALF), nasal lavage fluid, and serum were collected, and IgA antibody levels were measured using ELISA method.

Figure 3:
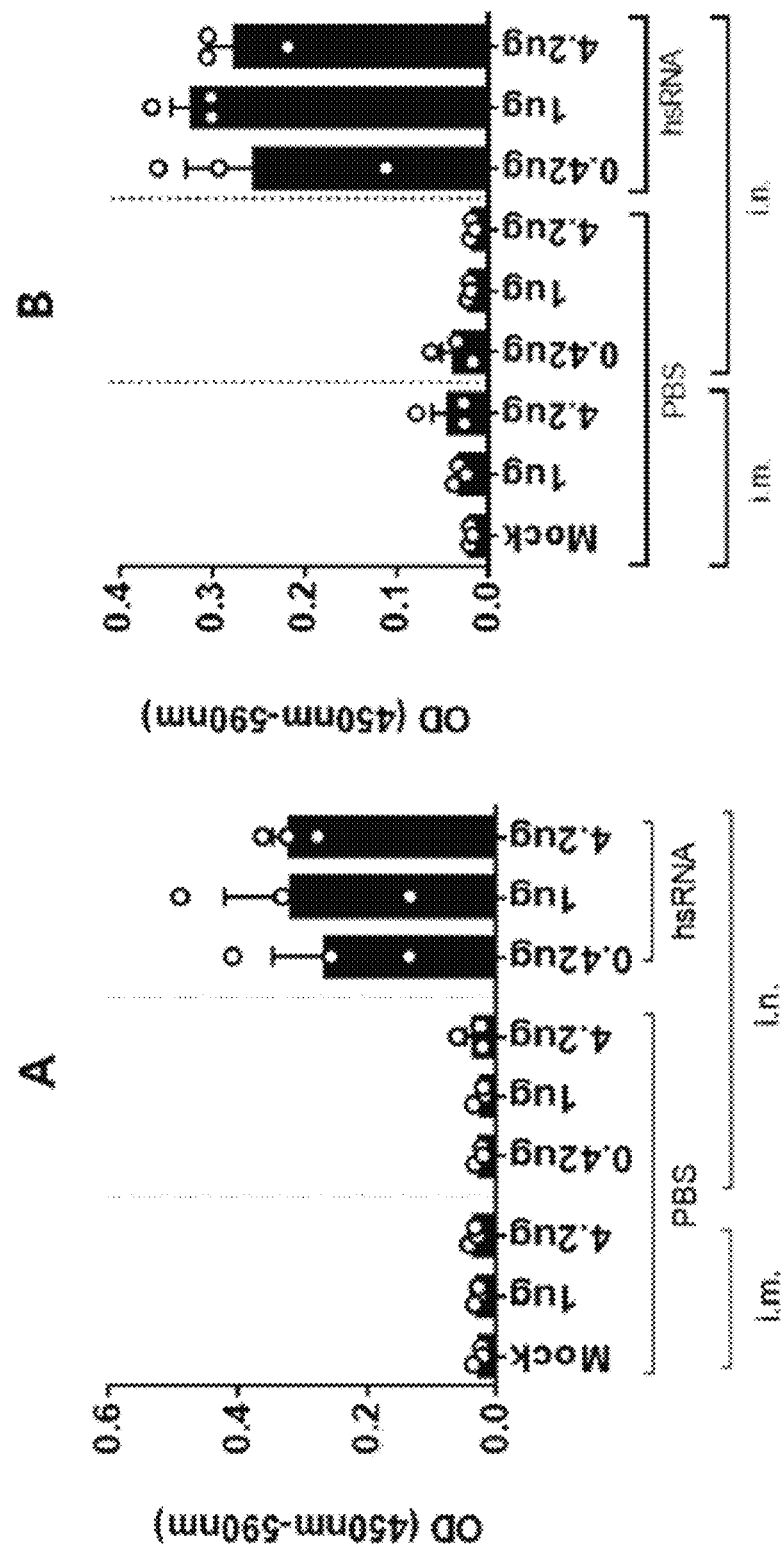

FIG. 3 shows results of measuring IgA levels in the BALF, nasal lavage fluid, and serum, after administration of the vaccine including hsRNA and iPR8 antigen. In FIG. 3, A and B represent IgA levels in the BALF and nasal lavage fluid, respectively. In A and D, the IgA levels were determined by measuring optical density (OD) at a wavelength of 450 nm to 590 nm in the ELISA method. A control group was subjected to intramuscular (i.m.) or intranasal (i.n.) administration of PBS.

As shown in FIG. 3, high levels of IgA were measured in the BALF and nasal lavage fluid, as compared with the control group, indicating that IgA levels are increased by intranasal administration of the vaccine composition, i.e., indicating that IgA levels are increased by mucosal immunization of the vaccine composition.

3. Effect on T Cell Response

As in the section 1 above, the vaccine was administered to mice by nasal spraying, and after two weeks, the booster was administered in the same manner. After two weeks, BALF was collected, and CD4+ T cell levels in BALF were measured using an intracellular cytokine staining method.

For intracellular cytokine staining, cells were restimulated with indicated antigens at 37° C./5% CO2 for 20 hours. Brefeldin A (Golgi Plug, BD Biosciences) was added and cells cultured for a further 4 hours. Cells were stained with Fixable Viability Dye eFluor 780 (eBioscience), then stained for surface markers for 30 min at 4° C. Following surface staining, cells were fixed and permeabilized by incubating in BD CytoFix-CytoPerm (BD Fixation/Permealization Kit™) for 20 min in the dark at 4° C. The cells were then washed BD Perm/wash buffer (BD Fixation/Permeablization Kit™) and re-suspended in Perm/wash buffer with fluorochrome conjugated monoclonal antibody and incubated for 30 min in the dark at 4° C. Cells were then washed in Perm/wash buffer prior to flow cytometry analyses. Samples were acquired and analyzed using an ACEA Novocyte.

Figure 4A:
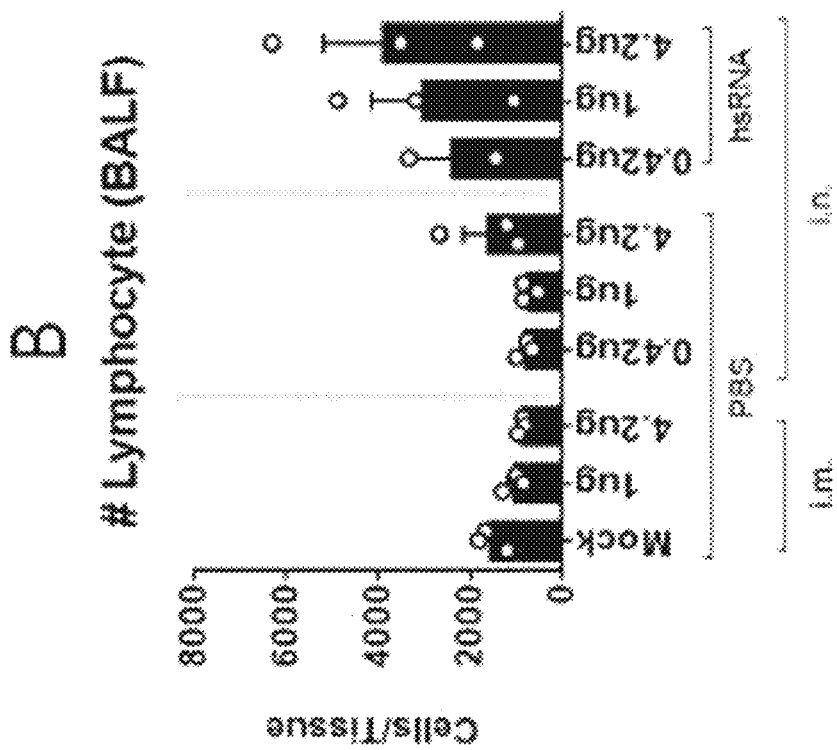
Figure 4A:
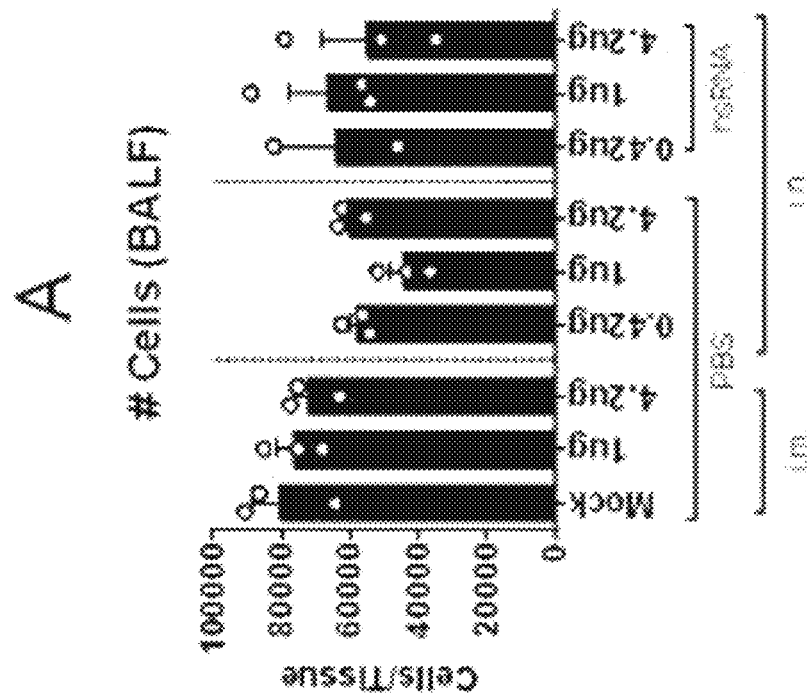

FIG. 4A shows results of measuring cell and lymphocyte levels in BALF, after administration of the vaccine including hsRNA and iPR8 antigen. In FIG. 4, A and B represent cell and lymphocyte levels in BALF, respectively. The lymphocyte represents the total lymphocytes including CD4+ T cells.

Figure 4B:
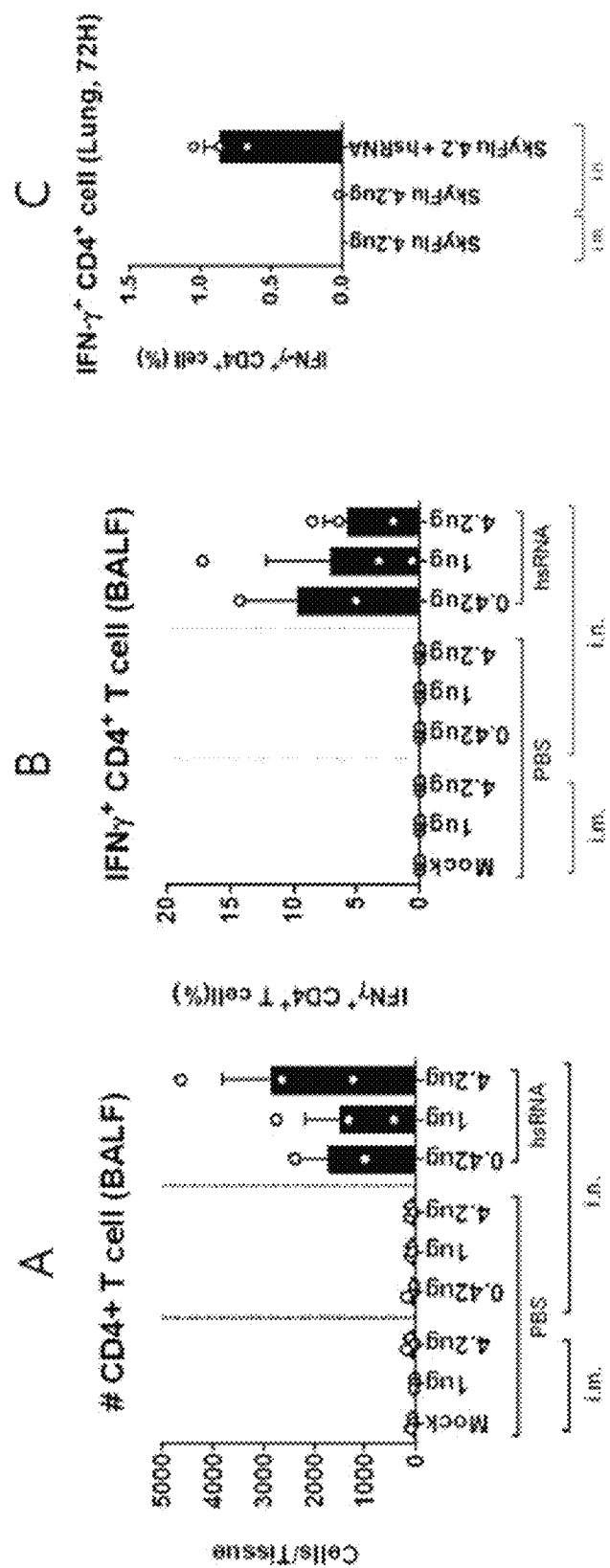

FIG. 4B shows CD4+ T cell and IFNγ+ T cell levels in BALF, after administration of the vaccine including hsRNA and iPR8 antigen, and IFNγ+ T cell levels after 72 hours. In FIG. 4B, A represent CD4+ T cells in BALF, and B and C represent IFNγ+CD4+ T cells in BALF and IFNγ+CD4+ T cells in the lung, respectively.

As shown in FIGS. 4A and 4B, when the vaccine including hsRNA and iPR8 antigen was administered, lymphocytes, e.g., antigen-specific CD4+T and IFNγ+CD4+ T cells increased in the BALF, as compared with the control group. Therefore, when the vaccine including hsRNA and iPR8 antigen was intranasally administered, immune responses were induced in the BALF and lung.

Further, a vaccine including inactivated H3N2 or inactivated B influenza virus, which was prepared by replacing the inactivated A/H1N1 influenza virus iPR8 in the vaccine descried in the section 1 by inactivated split H3N2 (Inactivated, split A/Cambodia/E0826360/2020, IVR-224(H3N2)) (Teratect prefilled syringe (Influenza split vaccine), Ilyang Pharmaceutical Co. Ltd.)) or inactivated split B (Inactivated, split B/Maryland/15/2016 and B/Phuket/3073/2013) (Teratect prefilled syringe (Influenza split vaccine), Ilyang Pharmaceutical Co. Ltd.) influenza virus was immunized in the same manner, and CD4+ IFNv+ T cell levels in the lung, IgG levels in the serum, and IgA levels in the nasal lavage fluid were measured. The number of CD4+ IFNv+ T cells in the lung was measured by the above-described intracellular cytokine staining method. The IgG levels in the serum, and IgA levels in the nasal lavage fluid were measured by the ELISA method. Further, immunization by intramuscular injection was also included, in addition to the nasal spraying.

Figure 5:
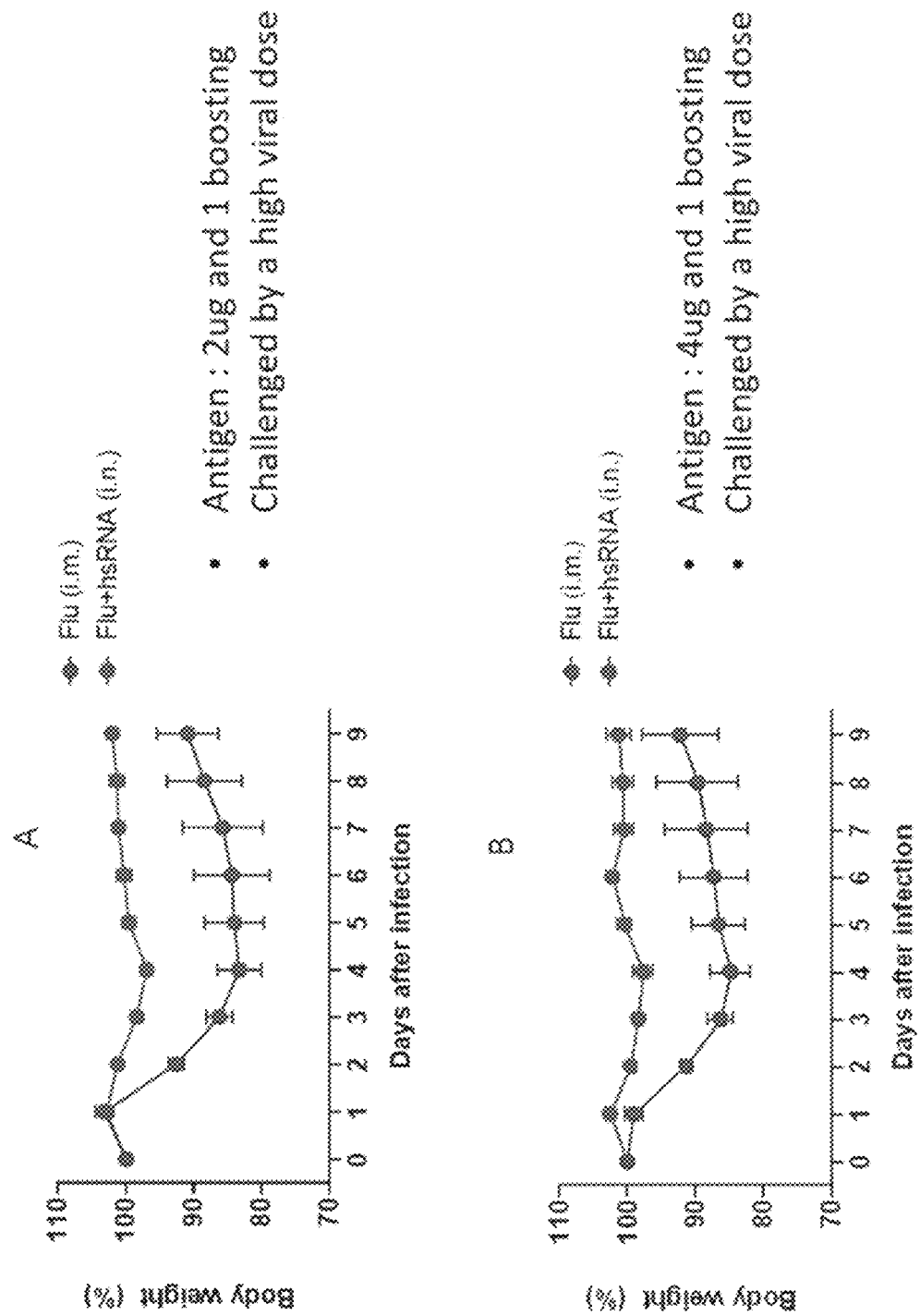

FIG. 5 shows results of measuring CD4+ IFNv+ T cell levels in the lung, IgG levels in the serum, and IgA levels in the nasal lavage fluid, after administration of the vaccine including hsRNA and inactivated H3N2 or B virus.

4. Enhanced Protective Immunity

It was examined whether intranasal administration showed a superior protective immunity, compared to intramuscular injection, when viral infection actually occurred.

Teratect prefilled syringe (Influenza split vaccine) (Ilyang Pharmaceutical Co. Ltd.) which is a commercially available quadrivalent vaccine was intramuscularly injected into a subject, or a vaccine was prepared by mixing with hsRNA as in the above section 1 and sprayed into the subject's nasal cavity. The subject was a mouse. The Teratect prefilled syringe (Influenza split vaccine) is a quadrivalent antigen vaccine including A Influenza H1N1, i.e., A/Victoria/2570/2019, IVR-215(H1N1) and H3N2, i.e., A/Cambodia/E0826360/2020, IVR-224(H3N2), B Influenza BV, i.e., B/Maryland/15/2016 and BY, i.e., B/Phuket/3073/2013 antigen.

FIG. 5 shows results of measuring body weight according to days, after intramuscular and nasal spraying administration of the vaccine including Teratect prefilled syringe (Influenza split vaccine), or hsRNA and Teratect prefilled syringe (Influenza split vaccine). 2 weeks after administration of a predetermined amount of the antigen, the booster was administered once with the equal amount thereof. 2 weeks after booster administration, Influenza A/Korea/2785/2009 (2009 pandemic strain) balb/c adapted (provided by KCDC, National Culture Collection for Pathogens NCCP43021, Korea Disease Control and Prevention Agency) virus was challenged in an amount of 5LD50 via nasal spraying. In FIG. 5, "Flu" represents Teratect prefilled syringe (Influenza split vaccine).

In FIG. 5, A and B represent administration of 2 ug and 4 ug of the antigen per subject, respectively. As shown in FIG. 5, when the vaccine including hsRNA and Teratect prefilled syringe (Influenza split vaccine) was administered via nasal spraying, the body weight was maintained remarkably high, as compared with intramuscular administration of Teratect prefilled syringe (Influenza split vaccine) alone. The vaccine including hsRNA and Teratect prefilled syringe (Influenza split vaccine) showed improved protective effects when a large amount of virus, rather than a small amount thereof, was challenged, as compared with administration of Teratect prefilled syringe (Influenza split vaccine) alone.

Through these results, a correlation between improved T cell response and the vaccine titer may be predicted.

5. Cross-Protective Immunity (1) Cross-Protective Immunity Between Influenza a Viruses The commercially available Teratect prefilled syringe (Influenza split vaccine) is a quadrivalent antigen vaccine including A Influenza H1N1 and H3N2, B Influenza BV and BY antigens. B Influenza BV and BY are Victoria lineage and Yamagata lineage, respectively. The reason for using the quadrivalent antigen vaccine is that even though four antigens are individually administered, individual antigens do not provide a cross-protective immunity against other viruses among the four types of viruses.

In this experiment, H3N2 antigen in the commercially available Terateect prefilled syringe (Influenza split vaccine) was provided by the manufacturer, and intramuscularly injected into subjects, or a vaccine was prepared by mixing with hsRNA as in the section 1, and sprayed into the nasal cavity of the subjects. The subjects were Balb/c mice. 2 weeks after administration with a predetermined amount of the antigen, the booster was administered in the same manner. 2 weeks after booster administration, the different subtype H1N1 virus was challenged in an amount of 3LD50 via nasal spraying.

Figure 6:
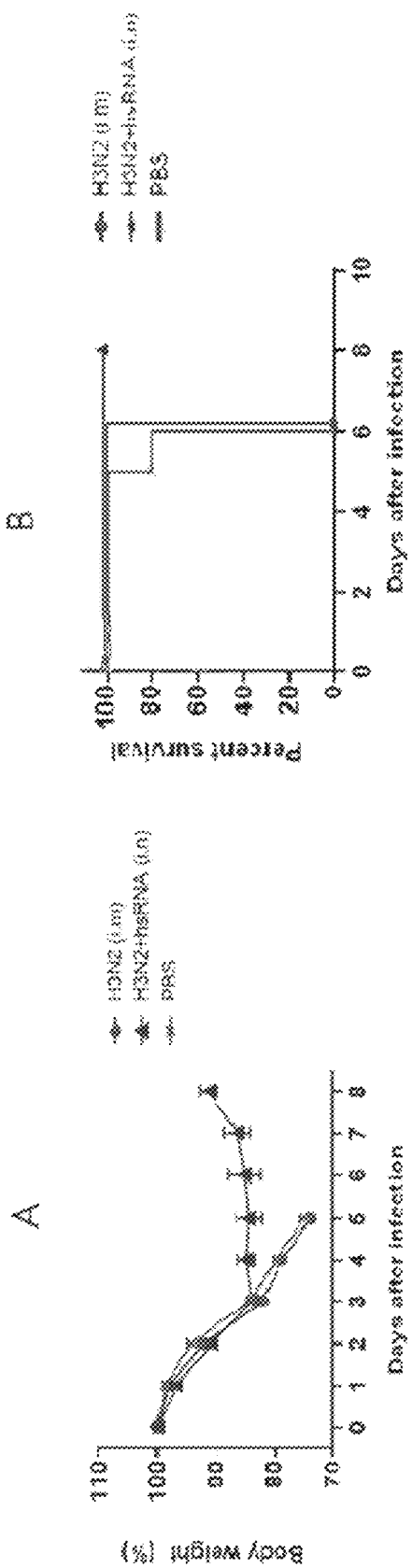

FIG. 6 shows results of measuring body weight according to days, after intramuscular and nasal spraying administration of the vaccine including H3N2 antigen, or the vaccine including hsRNA and H3N2 antigen, respectively and survival rates according to challenges of the different subtype H1N1 virus.

As shown in FIG. 6A, nasal spraying administration of the vaccine including hsRNA and H3N2 antigen showed high body weight, as compared with intramuscular administration of the H3N2 antigen.

As shown in FIG. 6B, when intramuscular injection of H3N2 antigen and nasal spraying administration of the vaccine including hsRNA and H3N2 antigen were performed on day 6 of the challenge, the survival rates according to challenge of the different subtype H1N1 virus were 0% and 100%, respectively, indicating that when the influenza A virus H3N2 antigen in combination with hsRNA is administered, subjects have a protective immunity against influenza A virus H1N1, and also indicating that when influenza A virus H1N1 antigen in combination with hsRNA is administered, subjects have a protective immunity against influenza A virus H3N2. In other words, when the influenza A virus antigen in combination with hsRNA is administered, subjects have a protective immunity against different subtypes of influenza A virus.

Figure 7:
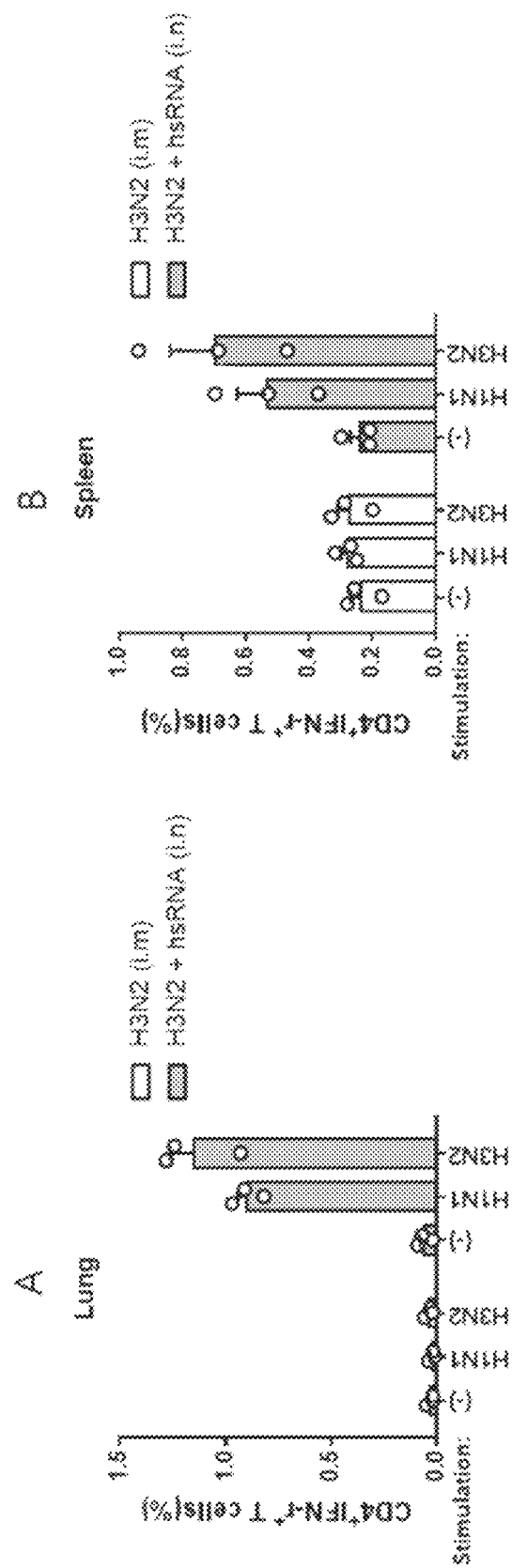

FIG. 7 shows results of measuring CD4+ IFNv+ T cell levels in the lung and spleen, after intramuscular injection and nasal spraying of a vaccine including inactivated H3N2 antigen, or a vaccine including inactivated H3N2 antigen or hsRNA, followed by challenge administration of H3N2 or H1N1 virus. The number of the CD4+ IFNv+ T cells in the lung and spleen was measured by the intracellular cytokine staining method.

As shown in FIG. 7A, when the vaccine including inactivated H3N2 antigen and hsRNA was administered via nasal spraying, high levels of CD4+ IFNv+ T cells were measured both in the H3N2 and H1N1 virus challenge. In contrast, when the vaccine including inactivated H3N2 antigen was intramuscularly administered, low levels of CD4+ IFNv+ T cells were measured both in the H3N2 and H1N1 virus challenge.

Further, as shown in FIG. 7B, when the vaccine including inactivated H3N2 antigen and hsRNA was administered via nasal spraying, high levels of CD4+ IFNv+ T cells were measured both in the H3N2 and H1N1 virus challenge. In contrast, when the vaccine including inactivated H3N2 antigen was intramuscularly administered, low levels of CD4+ IFNv+ T cells were measured both in the H3N2 and H1N1 virus challenge.

These results indicate that the vaccine including influenza A virus antigen in combination with hsRNA increased production of CD4+ IFNv+ T cells, thereby providing a protective immunity against different types or subtypes of virus.

In addition, these results indicate that when the influenza A virus H3N2 antigen in combination with hsRNA is intranasally administered, subjects have a protective immunity against influenza A virus H1N1. These results also indicate that when the influenza A virus H1N1 antigen in combination with hsRNA is intranasally administered, subjects have a protective immunity against influenza A virus H3N2. In other words, when the influenza A virus antigen in combination with hsRNA is intranasally administered, subjects have a protective immunity against different subtypes of influenza A virus.

(2) Cross-Protective Immunity Between Influenza B Viruses

The commercially available Teratect prefilled syringe (Influenza split vaccine) is a quadrivalent antigen vaccine including A Influenza H1N1 and H3N2, B Influenza BV and BY antigens. B Influenza BV and BY are Victoria lineage and Yamagata lineage, respectively. The reason for using the quadrivalent antigen vaccine is that even though four antigens are individually administered, individual antigens do not provide a cross-protective immunity against other viruses among the four types of viruses.

In this experiment, BV antigen in the commercially available Terateect prefilled syringe (Influenza split vaccine) was provided by the manufacturer, and intramuscularly injected into subjects, or BY antigen in the commercially available Terateect prefilled syringe (Influenza split vaccine) was provided by the manufacturer, and intramuscularly injected into subjects, or a vaccine was prepared by mixing BY antigen with hsRNA as in the section 1, and sprayed into the nasal cavity of the subjects. The BV virus used in the vaccine was a B/Maryland/15/2016 strain. The BY virus used in the vaccine was a B/Phuket/3073/2013 strain.

The subjects were Balb/c mice. 2 weeks after administration of a predetermined amount of 2 ug of the antigen, the booster was administered once with the equal amount thereof. 2 weeks after booster administration, the different subtype BV virus B/Shangdong/7/97 was challenged in an amount of 3LD50 via nasal spraying.

Figure 8:
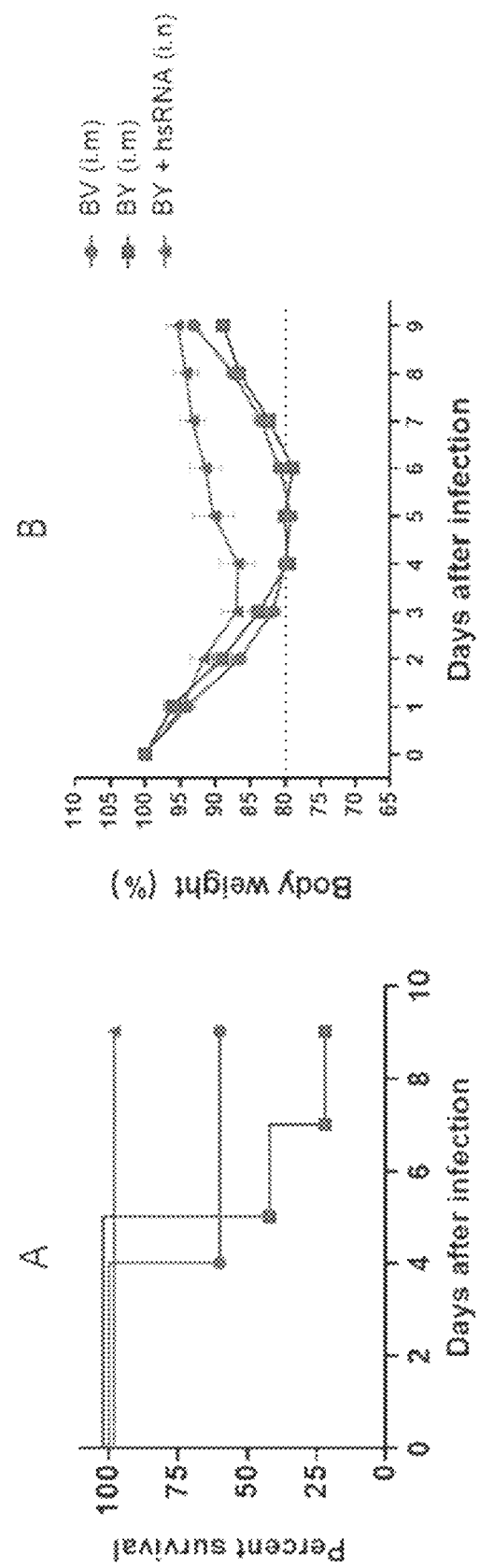

FIG. 8 shows results of measuring body weight according to days, after intramuscular and nasal spraying administration of the vaccine including BV antigen, the vaccine including BY antigen, or the vaccine including hsRNA and BY antigen, respectively, and survival rates according to challenges of the different subtype of BV virus.

As shown in FIG. 8A, when the vaccine including hsRNA and BY antigen was administered via nasal spraying, the survival rates according to challenge of the different subtype BV virus were high, as compared with intramuscular administration of BY antigen or BV antigen, indicating that when the influenza B virus BY antigen in combination with hsRNA is administered, subjects have a protective immunity against B virus BV, and also indicating that when influenza B virus BV antigen in combination with hsRNA is administered, subjects have a protective immunity against influenza B virus BY. In other words, when the influenza B virus antigen in combination with hsRNA is administered, subjects have a protective immunity against different subtypes of influenza B virus.

When the BV antigen was administered via intramuscular injection, the survival rates according to challenge of BV virus were about 60%, indicating that the BV strains used in the vaccine and challenge were B/Phuket/3073/2013 and B/Shangdong/7/97, respectively, which are different from each other, and the cross-protective immunity therebetween is not achieved when intramuscular injection is performed without hsRNA.

As shown in FIG. 8B, nasal spraying administration of the vaccine including hsRNA and BY antigen showed high body weight, as compared with intramuscular administration of the BY antigen or BV antigen.

Figure 9:
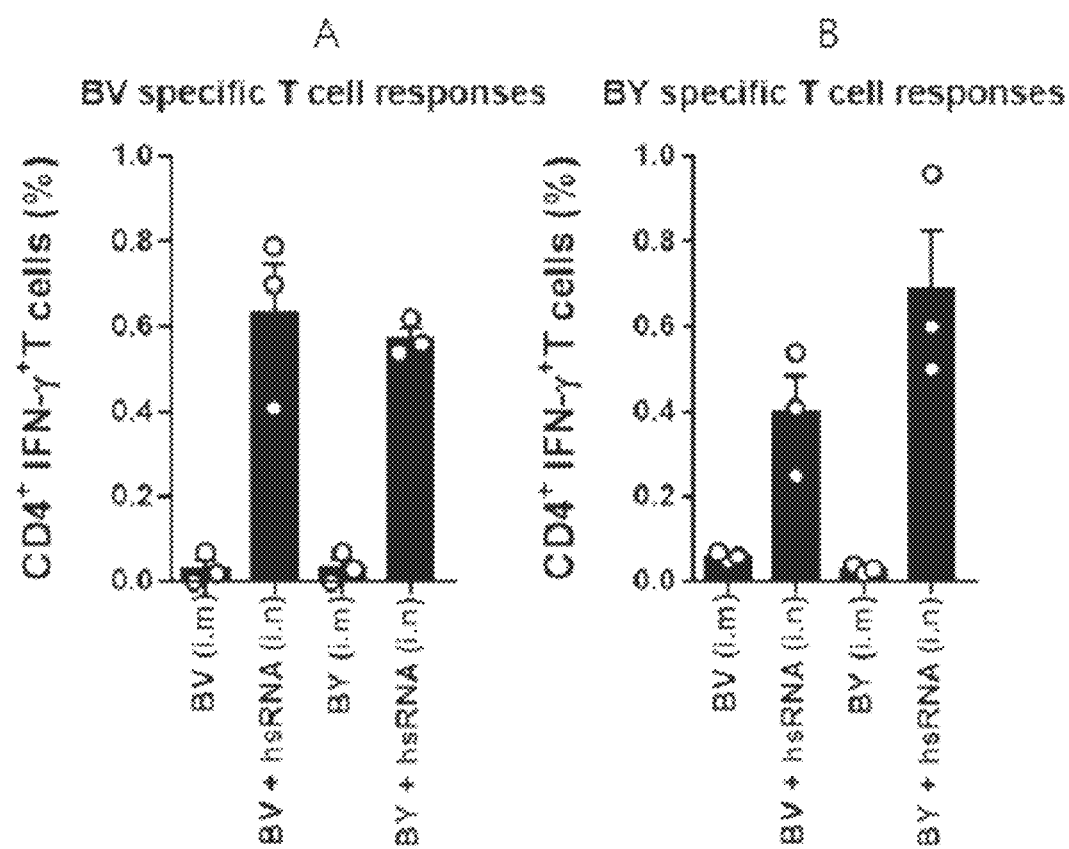

FIG. 9 shows results of measuring CD4+ IFNv+ T cell levels in the lung, after intramuscular injection and nasal spraying of the vaccine including inactivated BV antigen, the vaccine including inactivated BY antigen, the vaccine including inactivated BV and hsRNA, or the vaccine including inactivated BY antigen and hsRNA, followed by challenge administration of BV or BY virus. The number of CD4+ IFNv+ T cells in the lung was measured by the intracellular cytokine staining.

As shown in FIG. 9A, high levels of CD4+ IFNv+ T cells were observed both in nasal spraying administrations of the vaccine including inactivated BV and hsRNA and the vaccine including inactivated BY and hsRNA, when challenged with BV virus. In contrast, low levels of CD4+ IFNv+ T cells were observed both in intramuscular administrations of the vaccine including inactivated BV and the vaccine including inactivated BY, when challenged with BV virus.

As shown in FIG. 9B, high levels of CD4+ IFNv+ T cells were observed both in nasal spraying administrations of the vaccine including inactivated BV and hsRNA and the vaccine including inactivated BY and hsRNA, when challenged with BY virus. In contrast, low levels of CD4+ IFNv+ T cells were observed both in intramuscular administrations of the vaccine including inactivated BV and the vaccine including inactivated BY, when challenged with BY virus.

These results indicate that intramuscular injection of the vaccine including inactivated BV or BY does not induce T cell responses, i.e., an increase in the number of CD4+ IFNv+ T cells. In other words, intramuscular injection of the vaccine including inactivated BV or BY does not induce T cell responses, thereby providing no cross-protective immunity against different subtypes of the same B virus.

In contrast, nasal spraying administration of the vaccine including inactivated BV and hsRNA or the vaccine including inactivated BY and hsRNA induces T cell responses, i.e., an increase in the number of CD4+ IFNv+ T cells. In other words, nasal spraying administration of the vaccine including inactivated BV and hsRNA or the vaccine including inactivated BY and hsRNA induces T cell responses. Since T cell responses are induced, the vaccine including inactivated BV and hsRNA induces T cell responses, i.e., an increase in the number of CD4+ IFNv+ T cells, when challenged with BV virus which is the same subtype, as well as when challenged with BY virus which is the different subtype. In addition, since T cell responses are induced, the vaccine including inactivated BY and hsRNA induces T cell responses, i.e., an increase in the number of CD4+ IFNv+ T cells, when challenged with BY virus which is the same subtype, as well as when challenged with BV virus which is the different subtype.

In other words, nasal spraying administration of the vaccine including inactivated BV and hsRNA or the vaccine including inactivated BY and hsRNA may provide a cross-protective immunity against different subtypes of the same B virus.

Therefore, nasal spraying administration of a vaccine including an inactivated specific type of A, B, or C virus antigen and hsRNA may provide a cross-protective immunity against different subtypes of the same A, B, or C virus, indicating that nasal spraying administration of a vaccine including an inactivated specific type of influenza virus antigen and hsRNA may provide a cross-protective immunity against different subtypes of influenza virus, thereby providing a protective immunity against all types of influenza viruses regardless of the type of influenza viruses, i.e., thereby being used as a general purpose vaccine.

6. Mechanism of Action of Cross-Protective Immunity

When the vaccine including the inactivated influenza virus antigen and hsRNA is administered to a subject by nasal spraying, as described above, whether or not it provides a protective immunity against other types of influenza virus different from the administered inactivated influenza virus, i.e., the mechanism of action that provides a cross-immunity was examined by the following experiment.

H3N2 antigen in the commercially available Terateect prefilled syringe (Influenza split vaccine) was provided by the manufacturer, and 2 ug thereof was intramuscularly injected into subjects, or a vaccine was prepared by mixing the H3N2 monovalent vaccine with hsRNA as in the section 1, and sprayed into the nasal cavity of the subjects. The subjects were Balb/c mice. 2 weeks after administration of a predetermined amount of the antigen, the booster was administered once with the equal amount thereof. 2 weeks after booster administration, 200 ug of CD4 T cell depletion antibody, i.e., CD4 depletion antibody (GK1.5 clone, (GK1.5 clone, BE0003-1) which is a product from BioXcell was intraperitoneally administered on day 28 and day 32 after the first immunization to remove CD4 T cells in the subjects.

Next, removal of the CD4 T cells from the subjects was examined by a flow cytometry method. After confirming that CD4 T cells were removed, 3LD50 of another subtype of H1N1 virus was challenged through intranasal administration. As a control group, mice, to which a H3N2 monovalent vaccine was intramuscularly administered or a vaccine including hsRNA and H3N2 antigen was administered via nasal spraying, were treated with an antibody of an isotype control and challenged with H1N1 virus. The results are shown in FIGS. 10A and 10B.

Figure 10A:
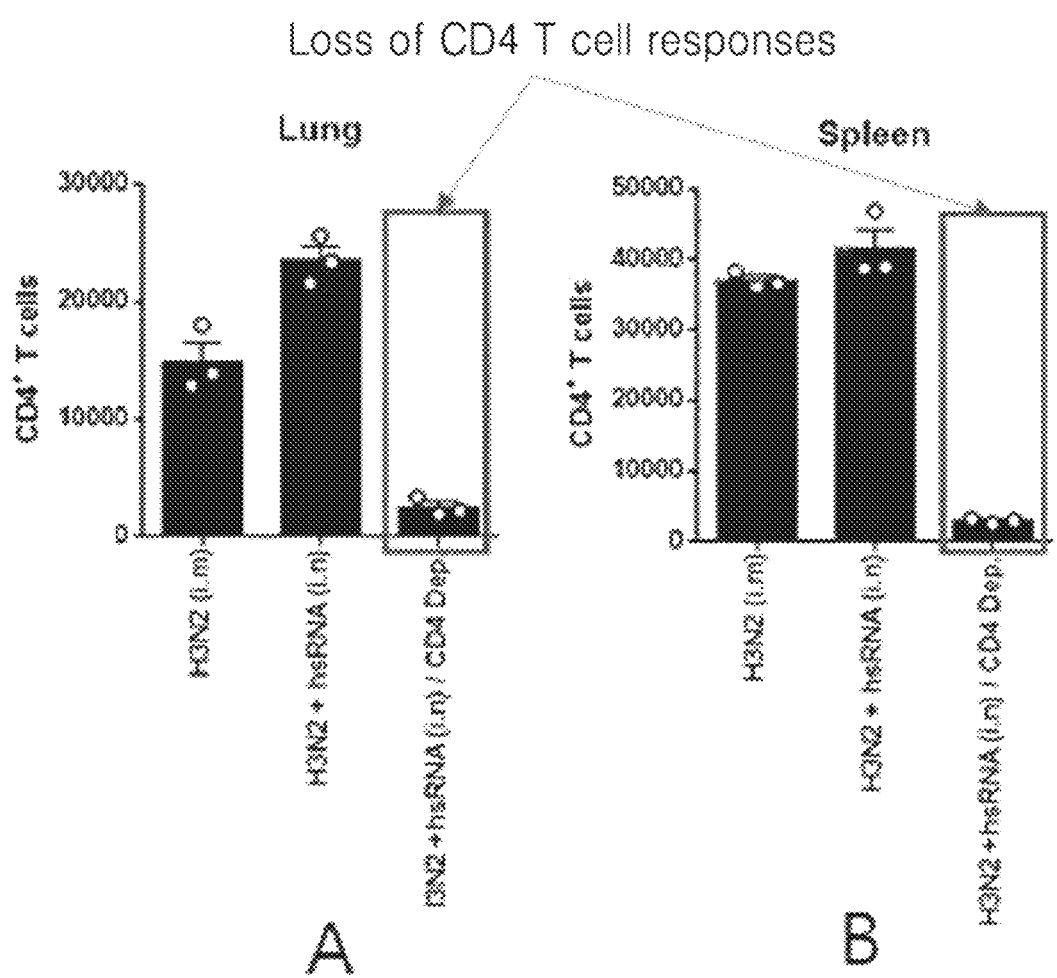

FIG. 10A shows results of measuring CD4+ T cell levels in the lung and spleen upon challenge administration of H1N1 virus after removing CD4 T cells from mice which had been subjected to nasal spraying of the vaccine including hsRNA and H3N2 antigen. As shown in FIG. 10A, upon challenge administration of H1N1 virus after removing CD4 T cells from mice which had been subjected to immunization with the vaccine including hsRNA and H3N2 antigen, CD4+ T cell levels in the lung and spleen were remarkably reduced, as compared with the control group. In contrast, the control group, i.e., upon challenge administration of H1N1 virus without removing CD4 T cells from mice which had been subjected to intramuscular injection of the H3N2 monovalent vaccine or nasal spraying of the vaccine including hsRNA and H3N2 antigen, high CD4+ T cell levels in the lung and spleen were observed.

Figure 10B:
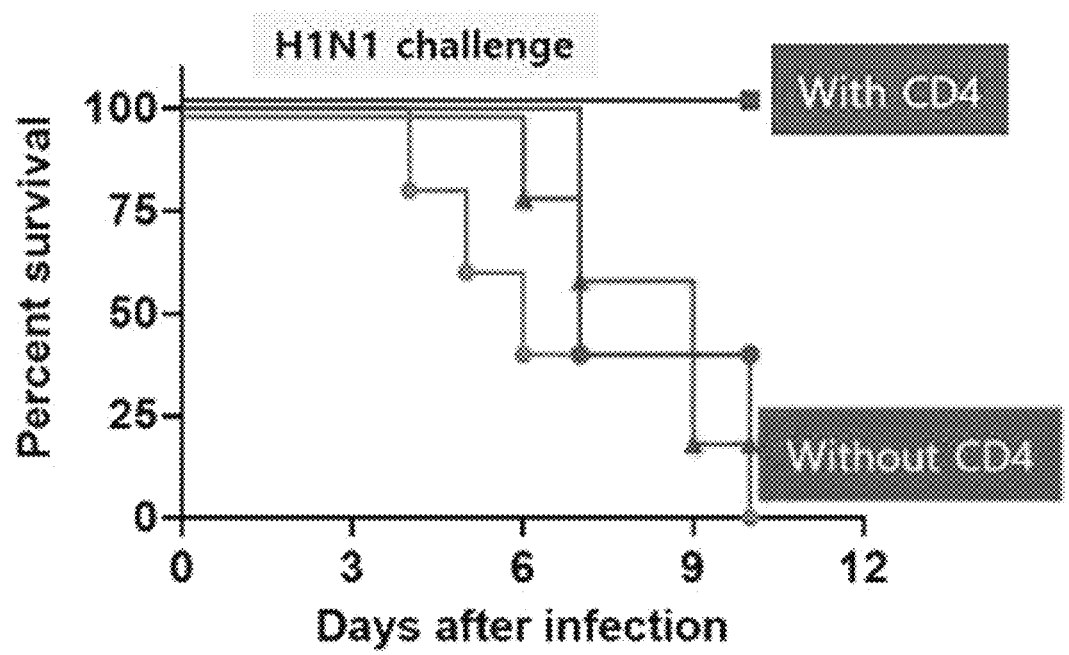

FIG. 10B shows percent survivals according to days upon challenge administration of H1N1 virus after removing CD4 T cells from mice which had been subjected to intranasal spraying of the vaccine including hsRNA and H3N2 antigen. In FIG. 10B, the blue line represents challenge administration of H1N1 virus without removing CD4 T cells from those immunized with the vaccine including hsRNA and H3N2 antigen, and the green line represents challenge administration of H1N1 virus after removing CD4 T cells from those immunized with the vaccine including hsRNA and H3N2 antigen. In addition, the red line represents an experimental group which was intramuscularly injected with the vaccine including H32N antigen, and the pink line represents a control group administered with PBS, i.e., immunized with no vaccine.

Further, to investigate the importance of T cell responses specific to the lower respiratory organ, e.g., the lung, only when the vaccine including hsRNA and influenza virus antigen is administered by nasal spraying, the following experiment was performed.

H3N2 monovalent antigen in the commercially available Terateect prefilled syringe (Influenza split vaccine) was provided by the manufacturer, and 2 ug thereof was intramuscularly injected into subjects, or a vaccine was prepared by mixing the H3N2 monovalent vaccine with 10 ug of hsRNA as in the section 1, and sprayed into the nasal cavity of the subjects. In addition, a vaccine prepared by mixing 10 ug of hsRNA, 10 ug of PolyIC, and 25% final volume of AddaVax in PBS as in the section 1 was intramuscularly injected into subjects, which were compared with those administered with a vaccine including PolyIC (Invivogen) and/or AddaVax™ (InvivoGen) and influenza virus antigen. AddaVax™ is an adjuvant having a squalene-based oil-in-water nano-emulsion formulation that induces immune enhancement. PolyIC is known to induce strong T cell responses as a TLR3 agonist. The subjects were Balb/c mice. 2 weeks after administration of a predetermined amount of the antigen, the booster was administered once with the equal amount thereof. 2 weeks after booster administration, each 3LD50 of H1N1 and H3N2 virus was challenged via nasal spraying. A control group was intramuscularly administered with a vaccine including H3N2 in PBS.

Figure 11A:
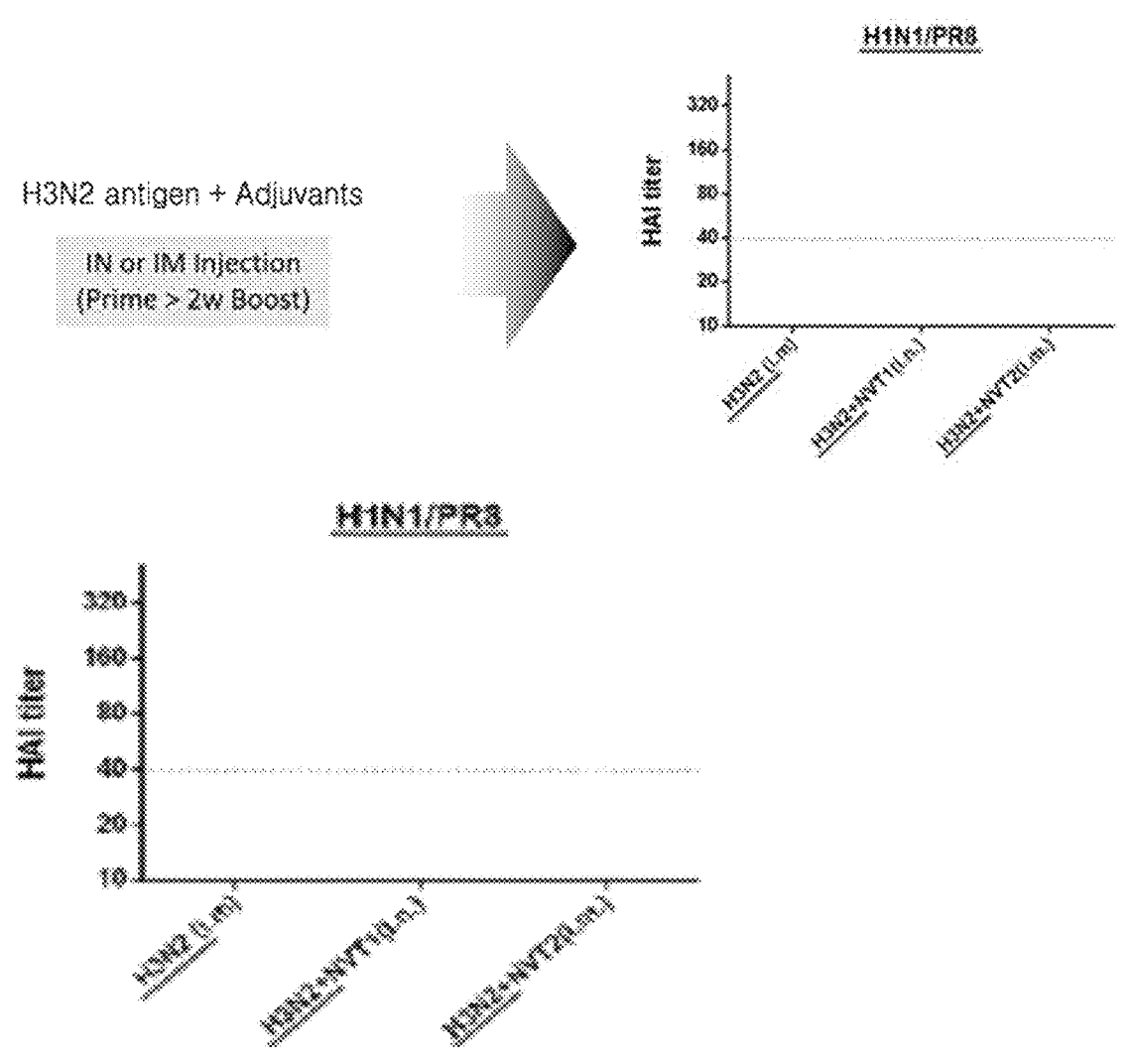

FIG. 11A shows results of measuring antibody titers by measuring HAI titers after immunization with each vaccine composition.

Figure 11B:
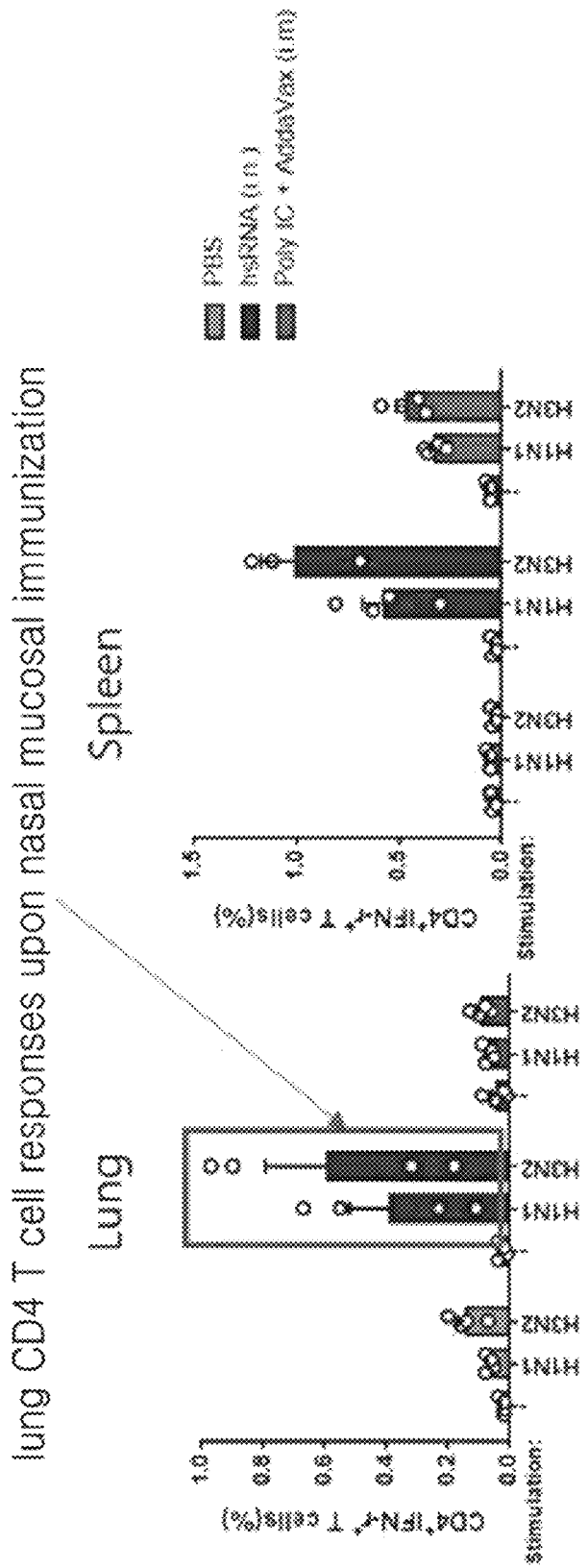

FIG. 11B shows results of measuring CD4+ T cell levels in the lung and spleen upon challenge administration of H1N1 virus after intramuscular administration of the vaccine including monovalent H3N2 in PBS, after intranasal spraying administration, to a subject, of the vaccine including hsRNA and monovalent H3N2 in PBS, after intramuscular administration, to a subject, of the vaccine prepared by mixing H3N2 antigen, PolyIC, and AddaVax in PBS.

As shown in FIG. 11B, when the vaccine including H3N2 antigen, PolyIC and AddaVax was intramuscularly administered, T cell responses were observed in the spleen (see B), whereas T cell responses were not observed in the respiratory organ including the lung (see A). In addition, when the vaccine including H3N2 antigen and hsRNA was administered via nasal spraying, T cell responses were induced when challenged with H3N2 virus, as well as when challenged with different subtypes of H1N1 virus.

Figure 11C:
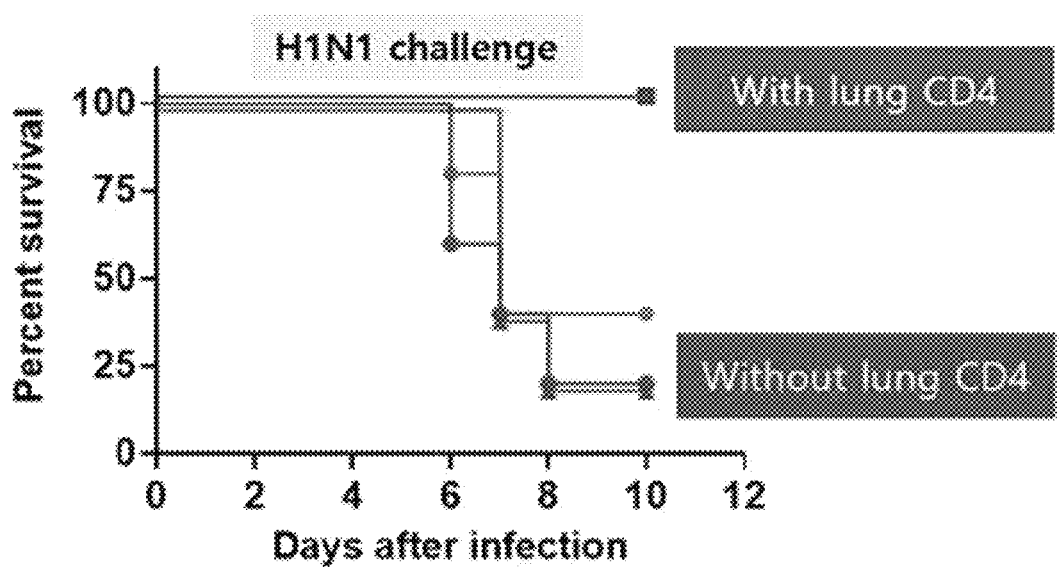

FIG. 11C shows percent survivals according to days upon challenge administration of H1N1 virus to mice which had been subjected to intranasal spraying administration of the vaccine including hsRNA and H3N2 antigen. In FIG. 11C, the blue line represents challenge administration of H1N1 virus after immunization with the vaccine including hsRNA and H3N2 antigen via nasal spraying, and the green line represents challenge administration of H1N1 virus after intramuscular immunization with the vaccine including polyIC, Addavax, and H3N2 antigen. The red line represents challenge administration of H1N1 virus after intramuscular immunization with the vaccine including H3N2 antigen and PBS. The pink line represents a mock group administered with no vaccine.

As described above, when the vaccine including influenza virus antigen and hsRNA was administered via the mucous membrane, T cell responses were induced in the respiratory organs including the lung, and the spleen. In particular, the vaccine including influenza virus antigen and hsRNA induced remarkable T cell responses in the respiratory organs including the lung. It is likely that not only antigen-specific protective immunity but also antigen nonspecific protective immunity is improved through induction of the T cell responses by the vaccine including influenza virus antigen and hsRNA. For example, through induction of T cell responses, the vaccine including the antigen and hsRNA may provide a protective immunity against the administered antigen-containing pathogen and may also provide a protective immunity against different antigens. Therefore, when the administered antigen is the influenza virus antigen, the vaccine may also exhibit a protective immunity or an enhanced protective immunity against different types or subtypes of influenza virus. For example, when the administered antigen is A influenza virus H3N2 antigen, the vaccine may exhibit a protective immunity or an enhanced protective immunity against B influenza virus or other subtypes of A influenza virus different from H3N2, such as H1N1.

7. Examination of Cross-Reactivity of Vaccine Including hsRNA and Influenza Virus Antigen Since influenza virus strains change every year, vaccines against influenza viruses use antigens derived from different influenza virus strains every year.

In this experiment, it was examined whether a vaccine against influenza virus epidemic in a specific year provides a protective immunity against influenza viruses epidemic in another year. Table 3 shows viruses epidemic in each year.

TABLE 3

| Type | Year | virus |
|---|---|---|
| H1N1 | 20-21 | 1. A/Guangdong-Maonan/SWL1536/2019 |
|  | 19-20 | 2. A/Brisbane/02/2018 |
|  | 18-19 | 3. A/Michigan/45/2015 |
| H3N2 | 20-21 | 4. A/Hong Kong/2671/2019 |
|  | 19-20 | 5. A/Kansas/14 |
|  | 18-19 | 6. A/Singapore/INFIMH-16-0019/2016 |
| BY | 18-21 | 7. B/Phuket/3073/3/2013 |
|  | 20-21 | 8. B/Victoria/705/2018 |
| BV | 19-20 | 9. B/Maryland/15/2016 |
|  | 18-19 | 10. B/Brisbane/60/2008 |

In detail, Teratect prefilled syringe (Influenza split vaccine) which is a commercially available quadrivalent vaccine was intramuscularly injected into a subject, or a vaccine was prepared by mixing Teratect prefilled syringe (Influenza split vaccine) vaccine with hsRNA as in the above section 1 and sprayed into the subject's nasal cavity. The Teratect prefilled syringe (Influenza split vaccine) vaccine is a quadrivalent antigen vaccine including A Influenza H1N1 and H3N2, B Influenza BV and BY antigens, and includes antigens derived from virus strains 1, 4, 7, and 8 epidemic in 2020 to 2021, as shown in Table 3. The subjects were Balb/c mice. 2 weeks after administration of a predetermined amount of the antigen, the booster was administered once with the equal amount thereof. 2 weeks after booster administration, the sera were isolated from subjects, and HAI titers were measured using a hemagglutination inhibition assay to examine neutralizing antibody levels. Further, 2 weeks after challenge, the lungs were isolated from the subjects, and CD4+ IFNv+ T cell levels in the lungs were measured. The number of CD4+ IFNv+ T cells in the lungs was measured by an intracellular cytokine staining method.

Figure 12A:
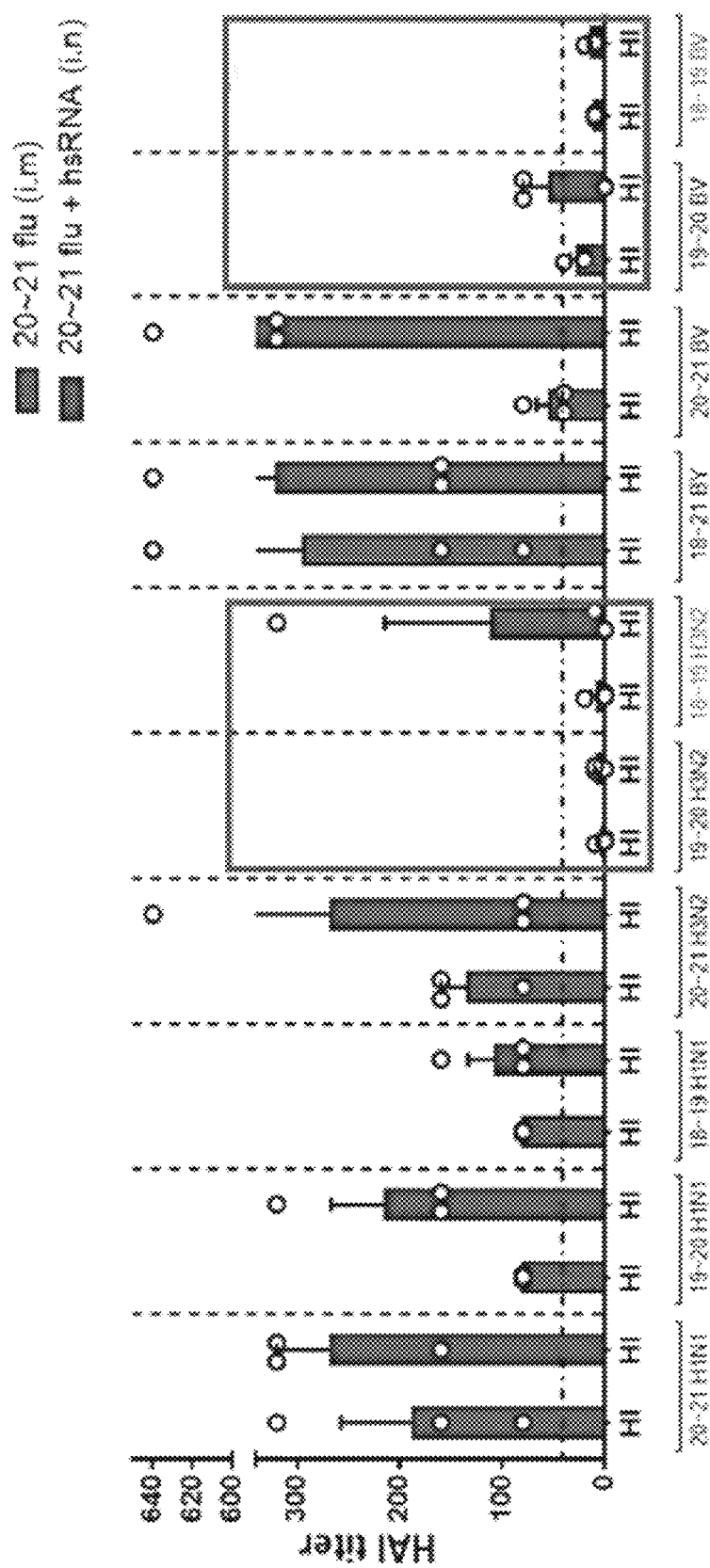

FIG. 12A shows results of measuring HAI titers after intramuscular and nasal spraying administration of Teratect prefilled syringe (Influenza split vaccine) vaccine, or the vaccine including hsRNA and the Teratect prefilled syringe (Influenza split vaccine) vaccine, respectively. As shown in FIG. 12, production of neutralizing antibodies against some viruses was not induced (see the box).

Figure 12B:
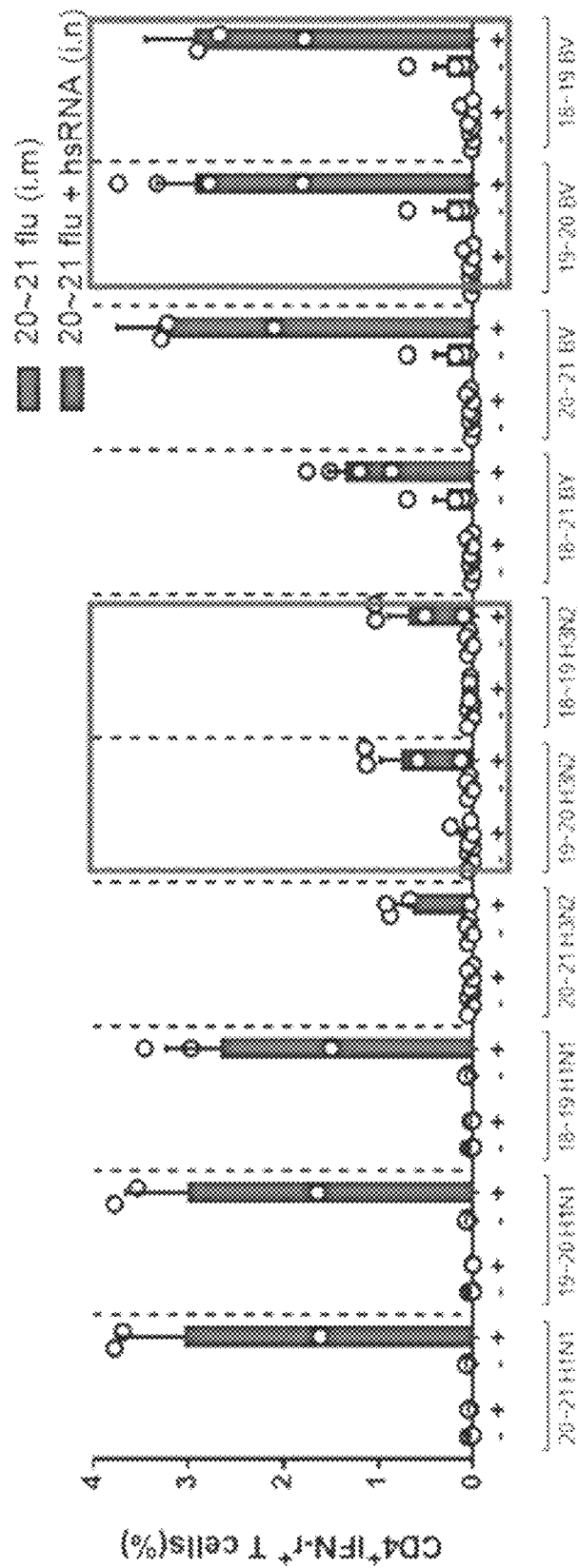

FIG. 12B shows results of measuring CD4+ IFNv+ T cell levels in the lungs after intramuscular and nasal spraying administration of Teratect prefilled syringe (Influenza split vaccine) vaccine, or the vaccine including hsRNA and the Teratect prefilled syringe (Influenza split vaccine) vaccine, respectively. As shown in FIG. 12B, when the vaccine including hsRNA and the Teratect prefilled syringe (Influenza split vaccine) vaccine was administered via the mucous membrane, T cell production was increased (see the box).

As described above, when the vaccine including hsRNA and the antigen including the influenza virus antigen was administered via the mucous membrane, antigen-specific T cell responses were induced in the mucous membrane and/or respiratory organs including lungs, and spleen. Unlike antibody responses, these T cell responses showed a cross-reactivity to other antigens, for example, virus variants. Accordingly, the vaccine including hsRNA and the antigen including the influenza virus antigen may increase not only a protective immunity against the administered antigen, for example, the specific administered virus strain, but also a protective immunity against its variants or other types of virus.

The invention claimed is:

1. A vaccine composition for preventing or treating influenza virus infection, the vaccine composition comprising:
    a hetero-structured ribonucleic acid (hsRNA) comprising a double-stranded ribonucleic acid (dsRNA) and single-stranded ribonucleic acids (ssRNAs), and
    a human influenza virus antigen,
    wherein the dsRNA is formed by complementary binding between a first single-stranded RNA and a second single-stranded RNA which are complementary to each other, and the ssRNAs are linked at both the 3'-ends of the dsRNA, respectively,
    wherein the hsRNA has 140 nt to 1682 nt in length,
    wherein the dsRNA region has 106 nt to 1648 nt in length,
    wherein the ssRNA region has 1 to 10 nt in length,
    wherein the hsRNA is obtained by complementary binding between the nucleotide sequence of SEQ ID NO: 1 and the nucleotide sequence of SEQ ID NO: 2, or has a UAUAG sequence at both the 3'-ends of dsRNA which is obtained by complementary binding between the nucleotide sequence of SEQ ID NO: 3 and a complementary sequence thereof, and
    wherein the influenza virus is influenza virus A or B type.

2. The vaccine composition for preventing or treating influenza virus infection of claim 1, wherein the ssRNA region has a UAUAG sequence at the 3'-end.

3. The vaccine composition for preventing or treating influenza virus infection of claim 1, wherein the influenza antigen is an inactivated or live attenuated influenza whole virus, a subvirion, or a subunit.

4. The vaccine composition for preventing or treating influenza virus infection of claim 1, wherein the vaccine composition has a formulation for intranasal or mucosal administration.

5. The vaccine composition for preventing or treating influenza virus infection of claim 1, wherein the vaccine composition provides a protective immunity against the human influenza virus, different subtypes of the homotypic viruses of the human influenza virus, or subtypes of the heterosubtypic viruses of the human influenza virus.

6. The vaccine composition for preventing or treating influenza virus infection of claim 1, wherein the human influenza virus antigen comprises one subtype virus antigen of type A influenza virus, one subtype virus antigen of type B influenza virus, or a combination thereof.

7. The vaccine composition for preventing or treating influenza virus infection of claim 1, wherein the human influenza virus antigen is a subtype antigen of type A influenza virus H1N1 without comprising other subtype antigens of type A influenza virus, or an H3N2 subtype antigen of type A influenza virus without comprising other subtype antigens of type A influenza virus.

8. The vaccine composition for preventing or treating influenza virus infection of claim 1, wherein the human influenza virus antigen is a BV subtype antigen of type B influenza virus without comprising other subtype antigens of type B influenza virus, or a BY subtype antigen of type B influenza virus without comprising other subtype antigens of type B influenza virus.

9. A method of immunizing a subject against an influenza virus, the method comprising administering the vaccine composition of claim 1 to the subject, wherein the influenza virus is influenza virus type A or B.

10. The method of claim 9, wherein the ssRNA region has a UAUAG sequence at the 3'-end.

11. The method of claim 9, wherein the influenza virus antigen is an inactivated or live attenuated influenza whole virus, a subvirion, or a subunit.

12. The method of claim 9, wherein the administering is nasal or mucosal administering.

13. The method of claim 9, wherein the method provides a protective immunity against the human influenza virus, different subtypes of the homotypic viruses of the human influenza virus, or subtypes of the heterosubtypic viruses of the human influenza virus.

14. The method of claim 9, wherein the human influenza virus antigen comprises one subtype virus antigen of type A influenza virus, one subtype virus antigen of type B influenza virus, or a combination thereof.

15. The method of claim 9, wherein the human influenza virus antigen is a subtype antigen of type A influenza virus H1N1 without comprising other subtype antigens of type A influenza virus, or an H3N2 subtype antigen of type A influenza virus without comprising other subtype antigens of type A influenza virus.

16. The method of claim 9, wherein the human influenza virus antigen is a BV subtype antigen of type B influenza virus without comprising other subtype antigens of type B influenza virus, or a BY subtype antigen of type B influenza virus without comprising other subtype antigens of type B influenza virus.

\* \* \* \* \*